United States Patent [19]

Lubarsky, Jr. et al.

[11] 4,076,970

[45] Feb. 28, 1978

[54] SWITCHING SYSTEM HAVING A CENTRAL CONTROLLER FOR ACCESSING INDIVIDUAL TELEPHONE CIRCUITS FOR TESTING

[75] Inventors: Andre Lubarsky, Jr.; G. Scott Warner; Goro R. Tahara, all of Sunnyvale, Calif.

[73] Assignee: Telecommunications Technology, Inc., Sunnyvale, Calif.

[21] Appl. No.: 729,585

[22] Filed: Oct. 4, 1976

[51] Int. Cl.[2] .......................................... H04M 3/22
[52] U.S. Cl. ............................... 179/175.2 R; 364/200
[58] Field of Search ................. 179/175.2 R, 175.3 R, 179/18 ES; 445/1

[56] References Cited

U.S. PATENT DOCUMENTS

| | | | |
|---|---|---|---|
| 3,250,863 | 5/1966 | Pearce | 179/175.2 R |
| 3,299,220 | 1/1967 | Wedmore | 179/175.2 R |
| 3,623,010 | 11/1971 | Burkhalter | 445/1 |
| 3,652,804 | 3/1972 | Comella | 179/18 ES |
| 3,729,715 | 4/1973 | Buedel | 445/1 |
| 3,829,627 | 8/1974 | Short et al. | 179/175.2 R |

OTHER PUBLICATIONS

"No. 1 EAX" *GTE Automatic Electric Technical Journal,* Oct. 1972, pp. 163-176.
Tele, "Centralized Supervision and Fault Location by Computer", 1973, pp. 23-33.
"SCC: Remote Control and Maintenance of Switching Offices", *Bell Lab. Record,* vol. 52, No. 7, pp. 206-211, Jul.-Aug., 1974, TT Items, No. 5.
TTI Practice M2000-041-03; Sep. 1975.
TTI Practice M2000-061-01; Aug. 1975.
TTI Practice M2000-041-01; Feb. 1975.
TTI Publication No. M2110-061-01; Oct. 1975.

*Primary Examiner*—Douglas W. Olms
*Attorney, Agent, or Firm*—Limbach, Limbach & Sutton

[57] ABSTRACT

A switching system for connecting any one of a plurality of electrical circuits to any one of a plurality of test positions, wherein a central controller including a microprocessor directs, in a pre-programmed manner, all necessary switching functions. In the preferred embodiment, the electrical circuits are telephone circuits and the test positions include test ports positioned in various locations around a central office so that any of the telephone circuits can be accessed for testing from any of the test ports. The controller communicates with each of the test ports and controls switching units one at a time over a common control bus.

16 Claims, 9 Drawing Figures

FIG. 4.

| INSTRUCTION NUMBER | OPERATION OF C.G. DECODING CIRCUIT 89 OF FIG. 2 — THIS DIGITAL SIGNAL FROM THE CONTROLLER 63 ON THE DATA BUS.... | | | | | | | | CAUSES THIS SIGNAL TO BE GENERATED IN A PROPERLY ADDRESSED CONNECTOR GROUP... | WITH THIS RESULT WITHIN THE CONNECTOR GROUP ...... | OPERATION OF SELECTION CIRCUIT 91 — AND WHICH CAUSES THE FOLLOWING SIGNAL TO BE SENT BACK TO THE CONTROLLER 63 ON THE DATA BUS 71 | | |
|---|---|---|---|---|---|---|---|---|---|---|---|---|---|
| | $D_7$ | $D_6$ | $D_5$ | $D_4$ | $D_3$ | $D_2$ | $D_1$ | $D_0$ | | | $D_7 D_6 D_5 D_4 D_3$ | $D_2$ | $D_1 D_0$ |
| (1) | 1 | 0 | 0 | 1 | 0 | 0 | 0 | 0 | SEND UNIT ADDRESS (LINE 93) | ENABLES SELECTION CIRCUIT 91 TO TRANSMIT UNIT ADDRESS TO CONTROLLER 63 | 0-9 * | FROM THE INDIVIDUAL UNIT ADDRESS SET 79 | 0-9 * |
| (2) | 0 | 0-9, A OR B * | | | | 0-7 * | | | CONNECT ACCESS POINT (LINES 95 AND 97) | SWITCHES OUTPUT LOGIC 99 AND 103 TO ENERGIZE ONE ACCESS POINT RELAY TO ACCESS THE DESIRED TELEPHONE CIRCUIT | | | |
| (3) | 1 | 0 | 0 | 0 | 0 | 0 | 0 | 1 | SPLIT CIRCUIT (LINE 175) | CAUSES THE CIRCUIT 173 TO SPLIT THE ADDRESSED TELEPHONE CIRCUIT | | | |
| (4) | 1 | 0 | 0 | 0 | 0 | 0 | 1 | 0 | UN-SPLIT CIRCUIT (LINE 177) | CAUSES THE CIRCUIT 173 TO UN-SPLIT THE ADDRESSED TELEPHONE CIRCUIT | | | |
| (5) | 1 | 0 | 0 | 0 | 0 | 1 | 0 | 0 | DROP CIRCUIT (LINE 181) | CAUSES OUTPUT LOGIC 99 AND 103 TO DE-ENERGIZE THE ACCESS POINT RELAY | | | |
| (6) | 1 | 0 | 0 | 0 | 1 | 0 | 0 | 0 | SEND FLAGS (LINE 183) | ENABLES THE SELECTION CIRCUIT 91 TO TRANSMIT FLAG BUS 185 SIGNALS TO CONTROLLER 65 | 0 0 0 1 0 | 0 0 0 | VACANT ACCESS POINT (FLAG WORD) |
| | | | | | | | | | | | 0 0 0 0 0 | 0 0 1 | SPECIAL CIRCUIT |
| | | | | | | | | | | | 0 0 0 0 0 | 1 1 0 | BRIDGE TERMINATION |

NOTE: * INDICATES EXPRESSION IN HEXADECIMAL CODE, WHEREIN:

| INSTRUCTION NUMBER | OPERATION OF TEST PORT DECODING CIRCUIT 249 OF FIG. 6 | | | | | | | | | | OPERATION OF SELECTION CIRCUIT 251 | | | | | | | | |
|---|---|---|---|---|---|---|---|---|---|---|---|---|---|---|---|---|---|---|---|
| | THIS DIGITAL SIGNAL FROM THE CONTROLLER 63 ON THE DATA BUS... | | | | | | | | CAUSES THIS SIGNAL TO BE GENERATED IN A PROPERLY ADDRESSED TEST PORT... | WITH THIS RESULT WITHIN THE TEST PORT... | AND WHICH CAUSES THE FOLLOWING SIGNAL TO BE SENT BACK TO THE CONTROLLER 63 ON THE DATA BUS 71 | | | | | | | |
| | $D_7$ | $D_6$ | $D_5$ | $D_4$ | $D_3$ | $D_2$ | $D_1$ | $D_0$ | | | $D_7$ | $D_6$ | $D_5$ | $D_4$ | $D_3$ | $D_2$ | $D_1$ | $D_0$ | |
| (1) | 1 | 0 | 0 | 1 | 0 | 0 | 0 | 0 | SEND UNIT ADDRESS (LINE 259) | ENABLES SELECTION CIRCUIT 251 | A or B* | | | | 0-9* | | | | FROM THE INDIVIDUAL UNIT ADDRESS SET 231 |
| (2) | 0 | 0 | 0 | 1 | 0 | 0 | 0 | 0 | SEND CG ADDRESS (LINE 261) | ENABLES SELECTION CIRCUIT 251 | | | | | 0-9* | | | | FROM THE PANEL AP ADDRESS DIAL 253 |
| (3) | 0 | 0 | 0 | 0 | 1 | 0 | 0 | 0 | SEND AP ADDRESS (LINE 263) | ENABLES SELECTION CIRCUIT 251 | | | | | | | | 0-9* | FROM THE PANEL AP ADDRESS DIAL 253 |
| (4) | 0 | 0 | 1 | 1 | 0 | 0 | 0 | 0 | SEND INSTRUCTION (LINE 281) | ENABLES SELECTION CIRCUIT 251 | 1 | 0 | 0 | 0 | 0 | 0 | 0 | 1 | WHEN LINE 279 INDICATES CIRCUIT IS TO BE SPLIT, OR |
| | | | | | | | | | | | 1 | 0 | 0 | 0 | 0 | 0 | 1 | 0 | WHEN LINE 277 INDICATES CIRCUIT IS TO BE UNSPLIT |
| (5) | 0 | 0 | 0 | 1 | 1 | 0 | 0 | 0 | CHECK CONTINUITY (LINE 283) | ENABLES CONTINUITY CHECK CIRCUIT 285 | | | | | | | | | |
| (6) | 0 | 0 | 1 | 1 | 1 | 0 | 0 | 0 | SEND CONTINUITY RESULT (LINE 289) | ENABLES SELECTION CIRCUIT 251 | 0 | 0 | 0 | 0 | 0 | 0 | 0 | 1 | WHEN LINE 291 INDICATES CONTINUITY TEST PASSED, OR |
| | | | | | | | | | | | 0 | 0 | 0 | 0 | 0 | 0 | 1 | 0 | WHEN LINE 291 INDICATES FAILURE OF CONTINUITY TEST. |
| (7) | 0 | 0 | 1 | 0 | 0 | 0 | 0 | 0 | BUSY (LINE 295) | LIGHTS BUSY LIGHT 293 | | | | | | | | | |
| (8) | 0 | 1 | 0 | 0 | 0 | 0 | 0 | 0 | ALARM (LINE 297) | LIGHTS ALARM LIGHT 299 | | | | | | | | | |
| (9) | 1 | 0 | 0 | 0 | 0 | 0 | 0 | 0 | WRONG ADDRESS (LINE 301) | LIGHTS WRONG ADDRESS LIGHT 303 | | | | | | | | | |
| (10) | 0 | 0 | 0 | 0 | 0 | 0 | 0 | 1 | SPECIAL CIRCUIT (LINE 305) | LIGHTS SPECIAL CIRCUIT LIGHT 307 | | | | | | | | | |
| (11) | 0 | 0 | 0 | 0 | 0 | 0 | 1 | 0 | BRIDGE TERMINATION (LINE 309) | ENABLES BRIDGE TERMINATION LIGHT 311 | | | | | | | | | |

FLAG WORD

NOTE: * INDICATES EXPRESSION IN HEXADECIMAL CODE, WHEREIN:

A = 10
B = 11
C = 12
D = 13
E = 14
F = 15

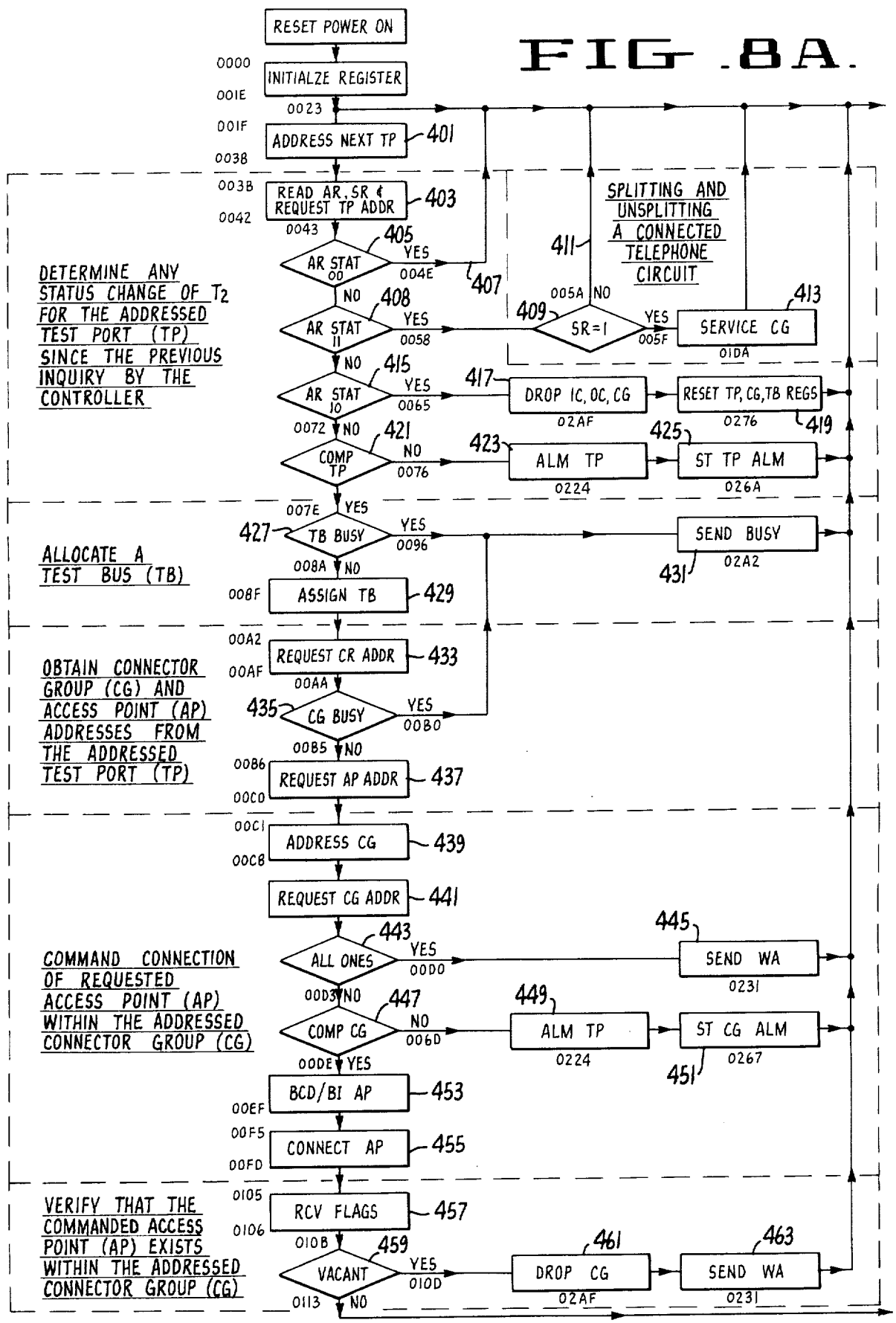

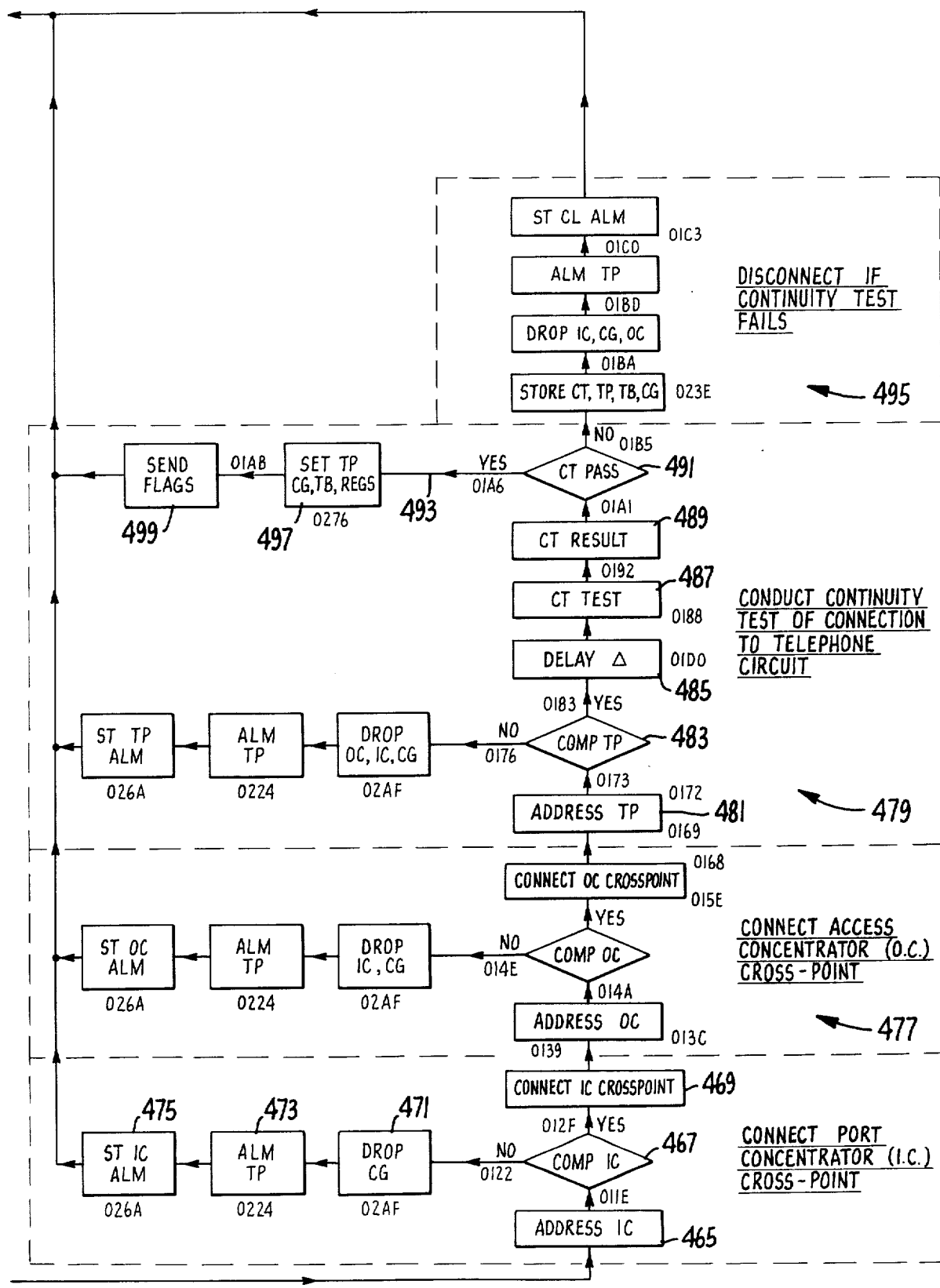

SWITCHING SYSTEM HAVING A CENTRAL CONTROLLER FOR ACCESSING INDIVIDUAL TELEPHONE CIRCUITS FOR TESTING

BACKGROUND OF THE INVENTION

This invention relates generally to switching systems and particularly to switching systems having utility in accessing telephone circuits from any of several testing locations.

It is a general practice to individually access special service telephone circuits in order to make tests upon the quality of the circuits. It has been a standard practice in the telephone industry to connect each of the special service telephone circuits to its own individual set of test jacks at a test board location in order to obtain test access. This requires a substantial amount of space for very large test boards to hold all of the thousands of jacks and involves a great deal of wiring since each of the telephone circuits to be tested must be brought individually to each test board.

More recently, other systems have been introduced wherein a few sets of test jacks are utilized to access a large number of telephone circuits my means of a dial initiated switching circuit. That is, a switching circuit at the location of the telephone circuits is commanded by a dialed signal from a test panel a distance therefrom to connect a particular one or more telephone circuits to the test panel jacks for testing. An existing system of this type is a Bell System SMAS (Switching Maintenace Access System). However, such access systems are still bulky and require a great deal of wiring.

Therefore, it is a principal object of the present invention to provide a switched access system particularly adapted for selectively accessing a large number of telephone circuits and that requires even less wiring between a test position and the telephone circuits, less bulk of equipment and space requirements than existing systems and one that is extremely reliable in operation.

It is another object of the present invention to provide such a switching system that is easily expandable in capacity so that unnecessary capacity does not need to be prematurely installed before it is needed.

It is a further object of the present invention to provide a switching system where a plurality of test ports can be located within a telephone switching office at various locations therein a distance from each other and a distance from the telephone circuit access points.

It is also an object of the present invention to provide a telephone switching access system that is easily compatible with additional remote measuring equipment.

SUMMARY OF THE INVENTION

Briefly and summarily, these and additional objects are accomplished by the various aspects of the present invention that include the use of common test buses, controlled switching devices for connecting a desired telephone circuit to be accessed to one of the test buses, further controlled switching means for connecting to that same test bus a test port at a remote position from the telephone circuits so the test can be conducted from that position, and a central controller including a permanently programmed microprocessor for controlling all of the various switching elements to effect a desired connection.

The controller sequentially scans each of the test ports to detect when an operator at that test port has indicated, by initiating a panel switch, a desire to have access from that port a specific telephone circuit for testing. When such an access request is first detected, the controller automatically takes over and communicates one at a time over a separate control bus with each of the switching units and the requesting test port to establish the desired test circuit connection. The common control bus is time shared and carries messages both from the controller to the individual switching element and back to the controller. Thus, considerable complications in wiring and other equipment in effecting such switching is significantly reduced. The remotely located test port is connected to the switching system by only a control bus and a single test circuit for accessing up to several thousands of telephone circuits from the test port.

Additional features, objects and advantages of the present invention are given as part of the following description of a preferred embodiment thereof, which should be taken in conjunction with the accompanying drawings.

BRIEF DESCRIPTION OF THE DRAWINGS

FIG. 4 is a table showing particular control instructions along a control bus of the system of FIG. 1 between its controller and a connector group of the type shown in FIG. 2;

FIG. 7 is a table showing the communications on the control bus of the switching system of FIG. 1 between the control portion of a test port and a controller to effect switching operations; and FIGS. 8A and 8B constitute a flow diagram of the program and operation of the controller in the switching system of FIG. 1.

DESCRIPTION OF THE PREFERRED EMBODIMENTS

Figure 1:
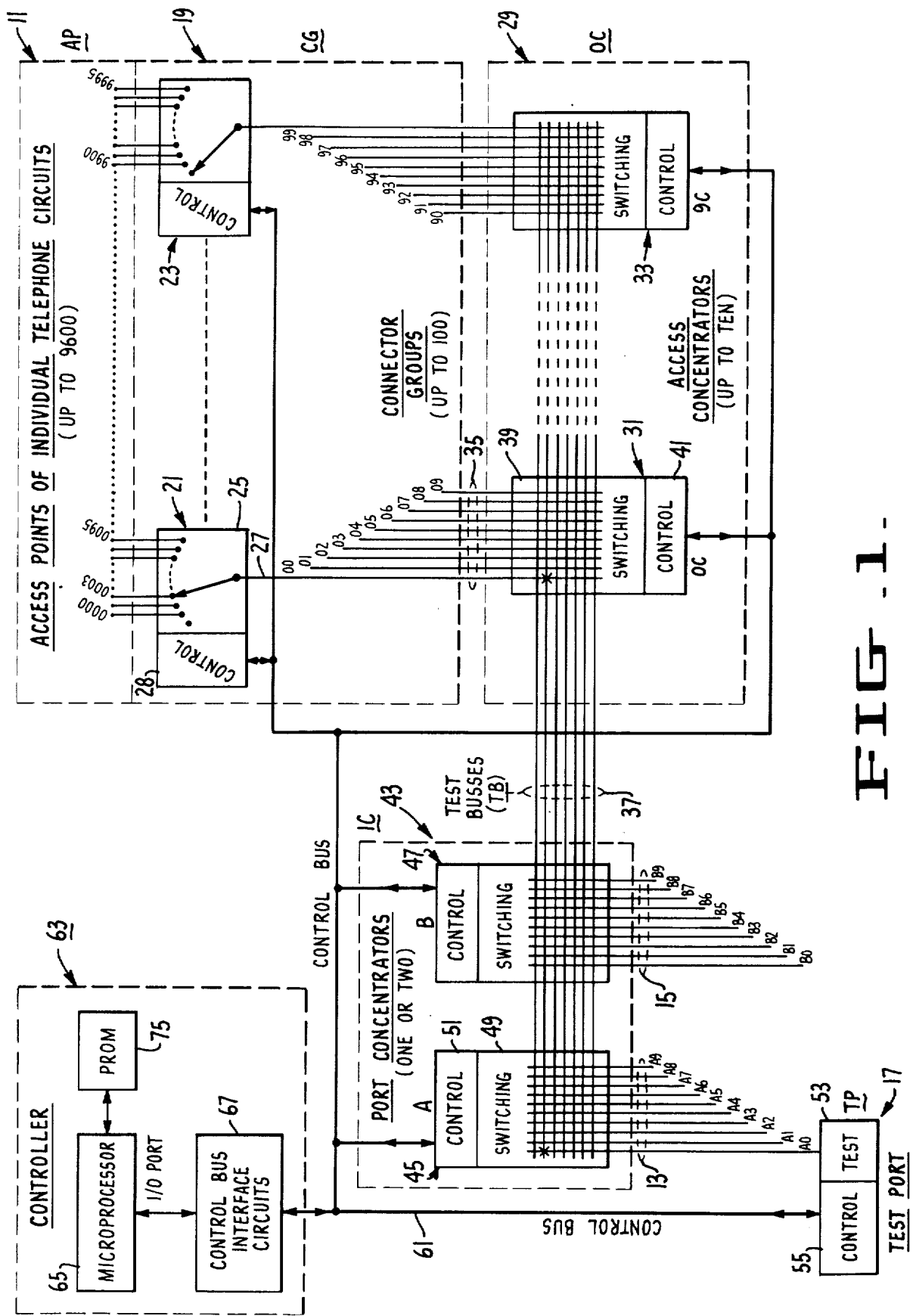
FIG. 1 schematically shows a preferred embodiment of a switching system according to the present invention as applied to a particular telephone circuit switched access application.

Initially, the overall switching system configuration will be generally described, principally with respect to the schematic system diagram of FIG. 1. The particular system to be described is commercially available from Telecommunications Technology, Inc., of Sunnyvale, California, the assignee of the present application. Of course, the various aspects of the present invention are not limited to the particular system and its details to be described hereinafter but rather this description is provided as an example of the utilization of the present invention in a specific telephone switching system.

Referring to FIG. 1, a large number of individual telephone circuits 11, up to 9600 in this example, can be accessed from any one of twenty test ports. One test port is connected to each of the circuits A0 through A9, denoted by the reference character 13, and one each to circuits B0 through B9, denoted by the reference character 15. For simplicity in the drawing, only one test port 17 is shown, being connected to line A0.

The connection of any one individual telephone circuit from the group 11 to any particular test port involves activating three different switching units. The first unit will be one of several connector groups 19. In this particular system, there may be anywhere from one to one-hundred connector groups. For simplicity again, only two connector groups 21 and 23 are shown in FIG. 1. Referring for the moment to the connector group 21, a switching circuit 25 is provided having a large number of relays, as described hereinafter in detail with respect to FIG. 2, but shown for simplicity in FIG. 1 as a rotary switch. The switching circuit 25 has as a function to connect one of the access points 11 connected to that switching unit, up to 96, to its output line 27. This switching is accomplished in response to logic and other functions provided by a control section 28. The connector group 21 provides the first selection of telephone circuits to be accessed.

The second switching unit involved in making a particular connection is one of a possible several access concentrators 29. Although only two access concentrators 31 and 33 are shown there may be from one access concentrator up to ten employed in any system. Each access concentrator, such as the unit 31, can have up to ten connector groups connected to it through 10 individual circuits 35. As an example, the output line 27 of the connector group 25 of FIG. 1 is shown connected to the input line 00 of the access concentrator 31. Each of the access concentrators is capable of connecting any one of its 10 input lines to any one of eight test buses 37. Each access concentrator, such as the access concentrator 31, contains a relay switching section 39 for accomplishing such connections and a control section 41 to selectively energize the appropriate relays to make a connection.

The third switching unit employed to make any particular connection is one of two possible port concentrators 43, one or both of the illustrated concentrators 45 and 47 being utilized in any particular application. The concentrator 45 has a switching section 49 that receives the test buses 37 as well as the test port lines 13. The switching circuits 49 are capable, in response to proper control functions in a control segment 51, of connecting any given one of the circuits 13 to any given one of the eight test buses 37. Similarly, the second port concentrator 47, utilized if more than ten test ports are to be employed in a given installation, is capable of connecting any one of its test port circuits 15 to any one of the test buses 37.

Figure 3:
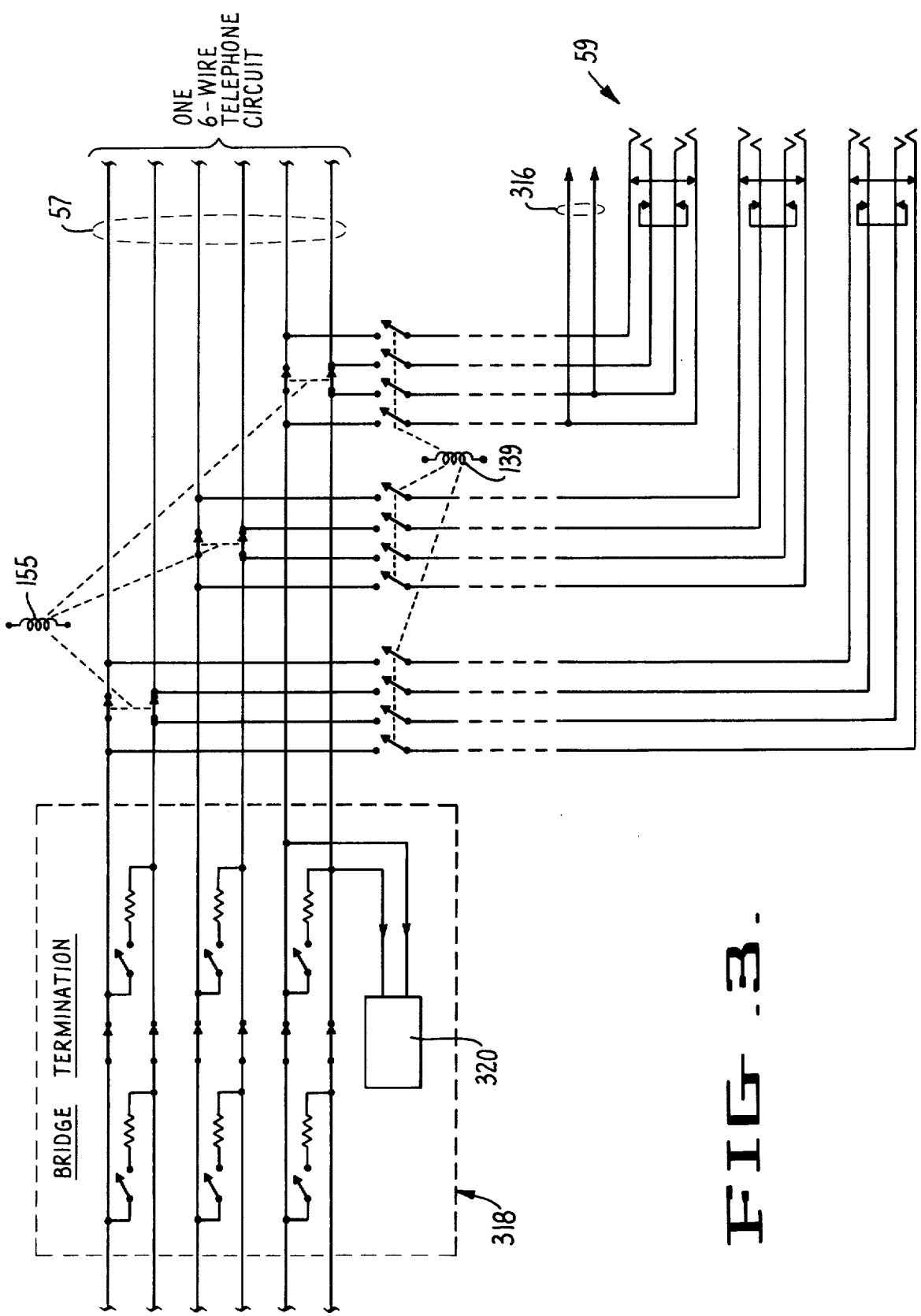
FIG. 3 illustrates a circuit diagram showing the connection by a switching system of FIG. 1 of a single telephone circuit to a set of test port test jacks.

Each of the test ports, such as the single test port 17 illustrated in FIG. 1, includes a test section 53 and a control section 55. The test section includes on a front panel thereof a termination of its respective test port line, in this case circuit A0, in front panel jacks capable of receiving external test equipment. When appropriate the connector group, access concentrator and port concentrator 45 are properly switched in a cooperative relationship, and a desired one of the telephone circuits 11 is connected to the test jacks on the panel 53 of the test port 17. FIG. 3 illustrates all of the conductors involved in a telephone circuit 57 of the type existing in the block 11 of FIG. 1, as well as the associated test panel 53 jacks 59 when the appropriate connections are made between the connector groups 19, access concentrator 29 and port concentrators 43 of FIG. 1. Referring again to FIG. 1, a connection from a telephone circuit 0003 to the test port 17 is shown, the line 00 into the access concentrator 31 being connected therein to the same test bus as is the line A0 into the port concentrator 45.

The particular telephone line to be accessed to a given test port is determined by the operator at that test port by operating the control panel 55. All of the control sections of each of the test ports and each of the switching units are connected in parallel to a common control bus 61. But the control signals from a control panel 55 of a test port are not communicated directly to each of the control sections of the switching units. In order to reduce the number of control lines to be run between the units, a central controller 63 is also connected in parallel to the control bus 61. None of the test ports or switching units communicate directly with each other but rather each of these units communicates through the control bus to the controller and the controller 63 then sends out control and information signals to each of the test ports and switching units after processing. Besides communicating with each of the test ports and switching units one at a time as required, the controller 63 receives back information from these units over the same circuits of the control bus, but at other times. Time sharing of the control bus 61 significantly reduces the number of circuits and equipment space necessary to effect the desired switching operations.

The heart of the controller 63 is a microprocessor 65. A particular microprocessor utilized, although there are many others, is the F8 line of the Fairchild Semiconductor Company. Particularly, two Fairchild integrated circuits are utilized: No. 3850, a central processing unit chip, and No. 3853, a static memory interface integrated circuit chip. This combination provides the necessary data manipulation capability as well as random access "scratch pad" memory (RAM). The construction and use of this particular microprocessor is described in numerous publications by the manufacturer, including a manual entitled "Fairchild Micro Systems F8 User's Guide."

Figure 6:
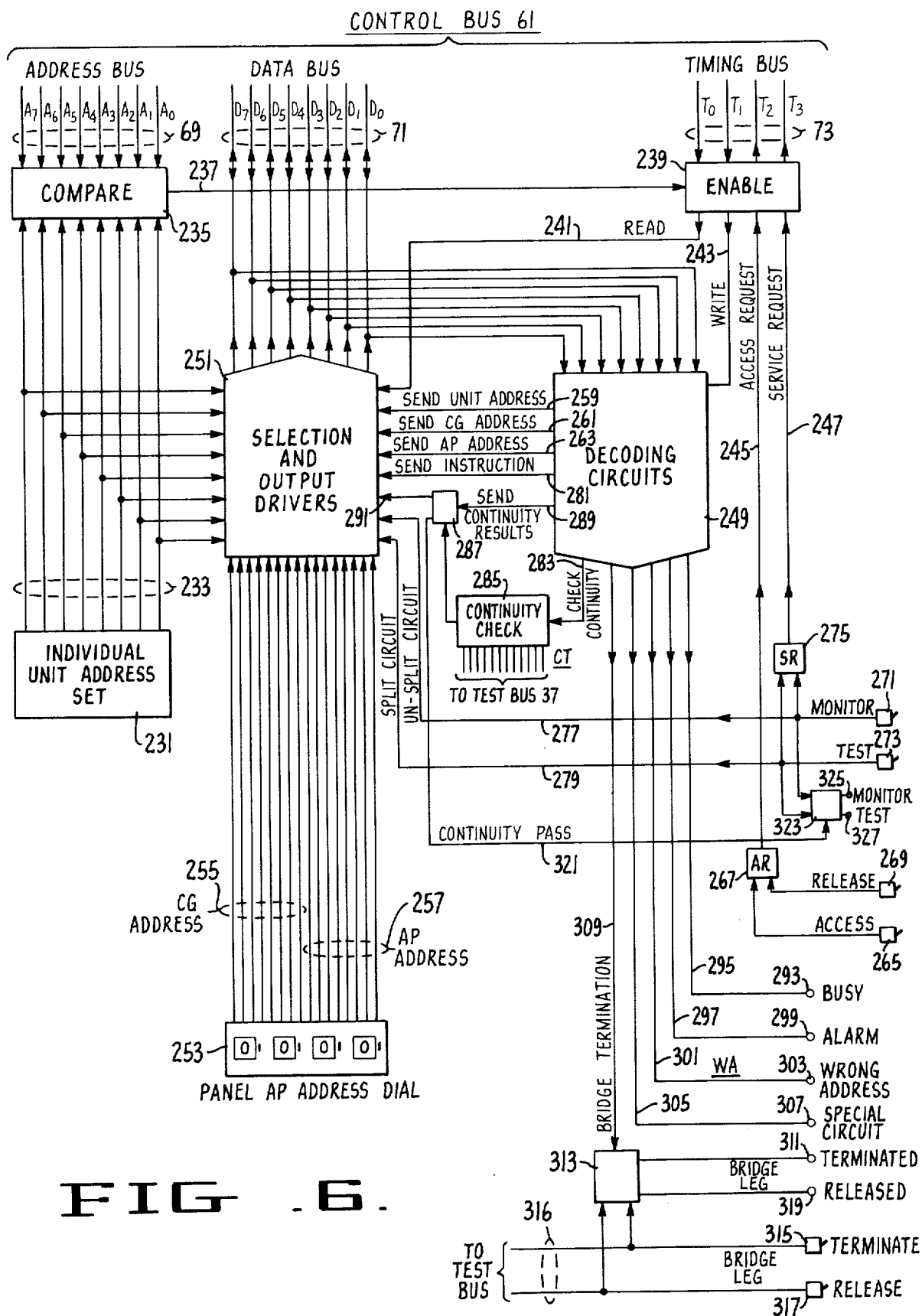
FIG. 6 is a schematic diagram of a control portion of a test port in the switching system of FIG. 1.

The control bus 61 is connected to an input-output (I/O) port of these chips making up the microprocessor 65 through interface and driving circuits 67. The interface 67 handles communications both ways onto and off of the control bus 61. Although the control bus 61 is shown as a single line in FIG. 1, it is in fact made up of three separate buses as shown on the left hand side of FIG. 2: an address bus 69, made up of eight lines $A_0$–$A_7$ for carrying eight bits of digital information, a data bus 71 containing eight lines $D_0$–$D_7$ for carrying eight bits of digital information, and a timing bus 73 having four lines $T_0$–$T_3$ ($T_2$ and $T_3$ lines not shown in FIG. 2 but they are shown at the top of FIG. 6). Each of the test ports and switching units of the system are connected in parallel to the address bus 69 and information is passed in only one direction from the controller 63 to these units, each unit having a particular unique address to which it responds. Therefore, the interface circuit 67 need only pass signals in one direction from the microprocessor 65 onto the address bus 69.

Another part of the circuit 67, however, interfaces with the data bus 71 which is a bi-directional bus so these circuits need to pass signals in both directions from the microprocessor 65 onto the data bus 71. Each of the test ports and switching units of the system of FIG. 1 is also connected in parallel to each of the eight lines of the data bus 71. It is over the data bus 71 that the controller 63 communicates commands to each of the test ports and switching units and also receives status and other information from each of the test ports and switching units. As is explained more fully hereinafter, only a test port or switching unit properly addressed on the address bus 69 is capable of communicating with the controller 63 over the data bus 71.

On the timing bus 73, the line $T_0$ carries in one direction from the controller to each of the test ports and switching units a "read" pulse. Another line $T_1$ carries a "write" pulse to each of these units. The lines $T_2$ and $T_3$ of the timing bus, however, carry information from each of the test ports to the controller, as explained hereinafter with respect to FIG. 6.

The controller 63 is set to operate in the desired manner by a programmable read only memory 75. Specifically, the memory 75 may be an integrated circuit chip sold by Intel, its No. 2708 PROM. A series of instructions permanently recorded in the memory 75 controls the operation of the microprocessor 65. The memory 75 is characterized by being programmed with the proper sequence of instructions by "burning in" the appropriate instructions. These instructions are illustrated in the flow chart of FIGS. 8A and 8B, to be described in detail hereinafter. Once a program is "burned in" the Intel 2708 type of memory 75, can be erased only by exposure for a time to strong ultraviolet light. For the purposes of equipment as this being permanently stored in the memory 75. Erasure of that memory is not contemplated.

The programming or "burning in" of the memory 75 can be accomplished by any one of several known techniques, one of which will now be briefly and generally described. Using a generalized instruction set published by Fairchild Semiconductor for its F8 microprocessor, the various instructions desired to be carried out by the programmed microprocessor are listed on a coding form provided by the manufacturer. These instructions for the instrument being described herein are illustrated in FIGS. 8A and 8B. These instructions are put on source tapes through a CRT typewriter terminal, such as is available from the Hewlett Packard Company. The source tape is then run as an input to the terminal with a blank tape receiving its output. During this run, a "F-8 Formulator", available for purchase or lease from the Fairchild Semiconductor Company, is connected to the terminal in a manner that the instructions are transferred to the second tape in a form that they can be written directly into the memory 75 for controlling the Fairchild F8 microprocessor 65. This second tape is referred to as an "object tape." A listing of the instructions carried by the object tape for the particular instrument being described herein is attached to this application as Exhibit 'A' and forms a part hereof.

Again using the Fairchild generalized instruction set, a second program is utilized for burning the object tape instructions into the memory 75, a copy of this second program for the particular system being described is attached hereto as Exhibit 'B' and made a part of this application. Both of these programs as recorded on their respective object tapes are then read into the "F-8 Formulator" whose output is then connected to another piece of equipment, a PROM burner, such as one manufactured by the Pro-Log Corp. under No. PM9005. Once one memory 75 has been programmed in this manner, duplicates may be made on the PROM burner equipment. The operation of the programs of Exhibit 'A' is given hereinafter with respect to FIGS. 8A and 8B. PROM's may also be burned by means of a manual keyboard on the Pro-Log PROM burner without the use of the second program of Exhibit 'B'. The second program of Exhibit 'B' only makes the PROM burning procedure more convenient.

Figure 2:
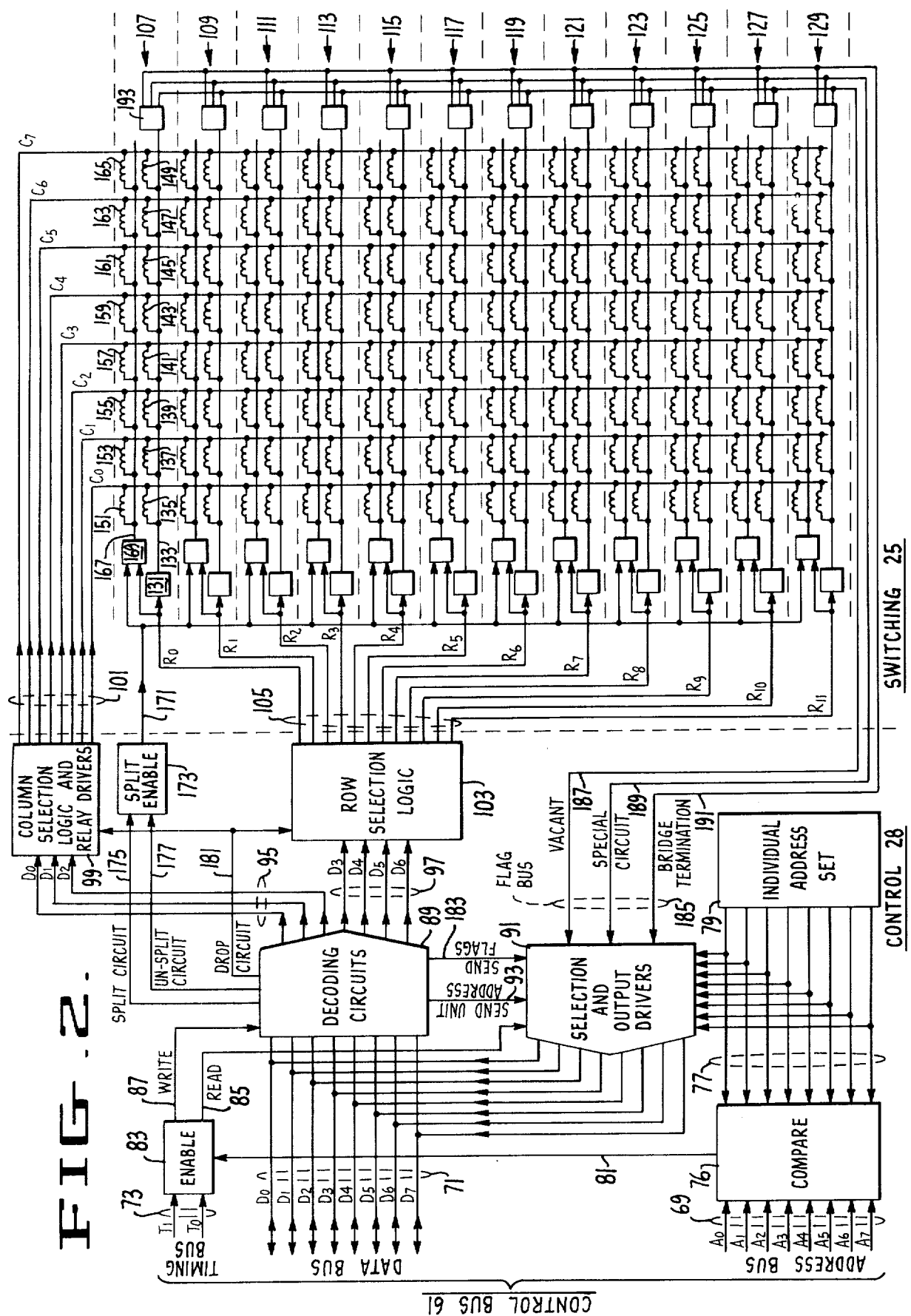
FIG. 2 is a schematic diagram of a single connector group switching block of FIG. 1.

Referring to FIG. 2, a schematic diagram of a single connector group unit is given, taken to be the connector group 21 of FIG. 1. However, it is to be understood that each of the individual connector groups within the block 19 have the same internal wiring diagram, only their specific unit addresses being set to be unique.

Referring to FIG. 2, the address bus 69 is connected to the control section 29 of this particular connector group example to a comparator circuit 76. The comparator circuit 76 also has as an input an eight bit digital word in line 77 as established by a switch 79 that permits the unique address code for each connector group to be inserted. The comparator 76 emits a compare signal in an output line 81 when the original signal in the address bus 69 is the same as the digital word presented thereto in the line 77. The comparator output line 81 is applied to a gating circuit 83 which enables the timing bus signals $T_1$ and $T_0$ to pass through to the lines 85 and 87, respectively, when there is this address comparison. The read and write timing pulses in the lines 85 and 87, respectively, then permit reception and transmission of information and commands on the data bus 71 between this unit and the controller 63 (FIG. 1).

The data bus 71 is connected directly into input decoding circuits 89 of FIG. 2 for receiving commands and information from the controller 63 over the data bus. Also connected to the data bus 71 are selection and output driver circuits 91 which communicate information from within the connector group back to the controller over the data bus 71. A write pulse from the controller in the line 87 enables the circuits 89 to receive and operate on whatever digital word is on the data bus 71 at the occurrence of the write pulse 87. Similarily, a read pulse in the line 85 from the controller 65 (FIG. 3) over the timing bus 73 will enable the output circuits 91 to transmit selected information over the data bus 71. Of course, the read and write pulses do not occur at the same time so this utilizes a single data bus 71 in a time sharing manner for two way communication. The circuits 91 also contain output drivers to provide a sufficient current to drive the cable capacitance of the data bus 71.

Referring to the table of FIG. 4 in conjunction with the circuit schematic of FIG. 2, these operating specifications for the circuit blocks 89 and 91, and thus their logic construction, may be understood. Referring to Instruction No. (1) of FIG. 4, the digital word shown in the first column when it appears in the data bus 71 is decoded by logic set to recognize that word, this logic emitting a command signal in a line 93. The word and signal in the line 93 indicates that the controller has asked this particular connector group to send back to the controller on the data bus 71 its unique unit address. Gating circuits within the block 91 which receive the individual unit address on the line 77 are switched on so that that address is presented to the output of the block 91 and thus onto the data bus 71. This is described in the right hand columns of the Instruction No. (1) of FIG. 4.

Of course, these various operations as just described and summarized in Instruction No. (1) across the first line of FIG. 4 do not happen simultaneously. The decoding circuits 89 are activated to receive the word on the data bus 71 only when the computer sends a write pulse through the line 87 to the circuits 89. When that write pulse is received, the circuits 89 and 91, through the signal in the line 93, are readied to send back to the controller the requested address of that particular switching unit. That information is actually sent back when the circuits 91 are enabled by a read pulse in the line 85 which comes from the controller at a subsequent clock time. Of course, none of this communication with the controller occurs unless the gating circuits 83 permit the read and write pulses in the timing bus to pass through to enable the circuits 89 and 91 and this occurs only when the unit address requested by the controller as applied to the address bus 69 compares with the unit address set by the switch 79. Therefore, the computer is communicating on the data bus at any given instant with only one unit.

Instruction No. (2) of FIG. 4 causes the address of the telephone circuit access point, which is to be connected into the test bus, to be conveyed through the decoding circuits 89 onto lines 95 and 97. That is, when the digital word has a "0" in the $D_7$ position occurs on the data bus 71, the decoding circuits 89 cause the bits on the lines $D_0$ through $D_6$ of the data bus 71 to be passed on through the circuits 89 to the lines 95 and 97. It will be noticed from the table of FIG. 4 that all of the data words sent by the controller to the individual connector group units have a binary "1" in the $D_7$ position except for this particular instruction which carries a binary "0" to distinguish this instruction from others.

The bits carried by the lines $D_0$ through $D_2$ of the data bus are applied to logic and driver circuits 99 which selects one of the columns $C_0$ through $C_7$ of the lines 101 of a relay matrix for energization of the proper relay. Similarly, the bits of the data line $D_3$ through $D_6$ are applied to logic circuits 103 for energization of one of the output row lines 105 of a relay energization matrix. For any given word of the form of Instruction No. (2) of FIG. 4 that appears on the data bus 71, assuming the proper address and write pulses as described above, will cause one of the lines 101, $C_0$ through $C_7$ to be energized and, simultaneously, one of the output lines 105, $R_0$ through $R_{11}$ to be energized, causing one relay coil at the intersection of the two energized lines to itself become energized and close the telephone line access contacts, in a manner now to be described.

The switching circuit 25 as shown in FIG. 2 shows twelve rows 107-129 of relay coils and associated driving circuits. Each of these rows of elements are physically provided in the system on separate, removably inserted access point relay circuit cards (one circuit card for each row). Therefore, if there are substantially less than the 96 possible telephone circuits which are to be accessed by the single connector group of FIG. 2, only enough of the cards 107 through 129 needs to be installed to accommodate the number of telephone lines to be accessed by this particular unit.

Since each of the rows 107 through 129 are configured the same, the row 107 will be described as typical. For that row, a relay coil driving circuit 131 is caused by the existence of a signal in the line $R_0$ to emit a relay driving voltage in the line 133. This causes one side of relay coils 135-149 to be simultaneously energized. The other sides of each of the relay coils 135 through 149 is attached to their respective column drive lines $C_0$ through $C_7$. When a signal exists in the line $R_0$, therefore, the particular relay coil attached to the line 133 and having its other terminal attached to the column lines $C_0$ through $C_7$ that is energized will cause its relay contacts to close. If we assume, for instance, that that column signal occurs in line $C_2$, then the relay coil 139 will be energized.

Referring to FIG. 3, the relay coil 139 is shown thereon as an example of what occurs at a single particular telephone circuit access point. Energization of the coil 139 causes 12 contacts to close to connect 12 points of the circuit 57 through the various switching units and test buses to the front panel test jacks 59 of a given test port.

Referring again to FIG. 2, it will be noted that there is yet another row of relay coils 151 through 165 as part of the circuit card 107, one terminal of which are connected respectively to the column energization line $C_0$ through $C_7$. The other terminal of each of the relay coils 151 through 165 is connected to a line 167 that is the output of a logic and driving circuit 169. The circuit 169 provides a voltage in the line 167 that will cause the one relay coil of the group 151-165 that is attached to the one column line $C_0$-$C_7$ that is energized to be made operative if a "split circuit" signal occurs in the line 171 and if there is a signal in the line $R_0$. That is, the circuit 169 causes the line 167 to be activated if that particular row has been addressed by its signal in $R_0$ and if a "split circuit" signal occurs in the line 171.

Referring briefly to FIG. 3, the relay coil 155 is shown to split the six telephone circuit lines 57 by opening normally closed relay contacts in each of the paths. It will be noted that when these relay contacts are opened, there are a pair of lines connected on either side thereof that are connected through the various switching units and test buses to a given test port set of jacks 59. It will be noted from FIG. 2 that the splitting relay coil 155 can be energized only when its associated access point relay coil 139 has been energized to close its normally opened contacts.

Referring again to FIG. 2, the split circuit signal in the line 171 occurs at the output of a logic circuit 173 that has as its input a "split circuit" signal in a line 175 and an "un-split circuit" signal in a line 177. These latter two lines eminate from the decoding circuits 89 and the conditions which cause a signal to be present in either one of them will now be described. Referring to Instruction No. (3) of the table of FIG. 4, the circuits 89 are provided with a logic circuit that detects the existence of the word given in the first column in that line on the data bus 71 and in response to it causes a signal to be emitted in the split circuit line 175. Similarily, referring to Instruction No. (4) of the table of FIG. 4, the circuits 89 contain logic to recognize the word on the data bus 71 given in the first column of that instruction line, and in response thereto provides a signal in the "un-split circuit" line 177. The circuit 173, therefore, holds in its output line 171 a split or an un-split signal in response to the momentary initiating signals in its input lines 175 and 177. The line 171 is applied to each of the rows 107 through 129 of the relay coils, but because that signal is gated with the particular row driving signal $R_0$-$R_{11}$, only that spliting relay coil in the enabled row can be energized.

Referring again to the table of FIG. 4, an Instruction No. (5) indicates that the structure of the decoding circuit 89 of FIG. 2 also includes logic circuits to detect that particular word and when detected emits a "drop circuit" signal in a line 181 which is applied to each of the logic circuits 99 and 103. These circuits are constructed so that any output signal in their respective lines 101 and 105 is removed until the next time that an instruction according to Instruction No. (2) of FIG. 4 is received on the data bus 71.

Referring to Instruction No. (6), the last line on the table of FIG. 4, the circuits 89 contain additional decoding circuitry so that a "send flags" signal is emitted in line 183 in response to the data bus word shown in the first column of Instruction No. (6) of FIG. 4. The send flag signal in the line 183 is applied directly to the output circuit 91 which provides means for connecting the signals on a flag bus 185 to the data bus 71 for communication to the controller 63 (FIG. 1). Several bits of flag information can be communicated to the controller this way, three bits being shown by a three line flag bus 185. The three signals that form a flag word in this particular example are a "vacant" access point signal in a line 187, a "special circuit" signal in a line 189 and a "bridge termination" signal in a line 191. These signals are generated from only one of the relay boards 107 through 129 that is accessed by a signal in the appropriate one of the lines 105. For instance, if the first row 107 of relay coils is accessed by a proper signal in a line $R_0$, a circuit 193 is energized thereby and emits into the flag bus 185 these three signals. Similar circuits to the circuit 193 that exist in the other relay boards 109 through 129 are not, under that condition, enabled to provide a signal to the flag bus 185. The circuit 193, as it is in all of the other boards, provides an occupied (or non-vacant) signal in the line 187 merely if that relay card is in place.

That is, if any relay card is not in place and the controller 63 (FIG. 1) tries to access that missing card, a vacant signal in the line 187 will tell the controller 63, when it asks, that a telephone circuit cannot be accessed with the printed circuit board missing. The other two flag signals in the lines 189 and 191 are provided by switches that are manually set on each of the circuit boards 107-129 as part of the same circuit. However, the status of these switches, each of which has only two positions, is not transmitted to the flag bus unless the particular row line 105 associated with that signal has been energized. As described later with respect to FIG. 6, the existence of any of the vacant, special circuit or bridge termination signals in the flag bus is recommunicated by the controller along the control bus 61 to the accessing test port and lights a panel light on the test port to tell the operator of the existence of one of these conditions.

Figure 5:
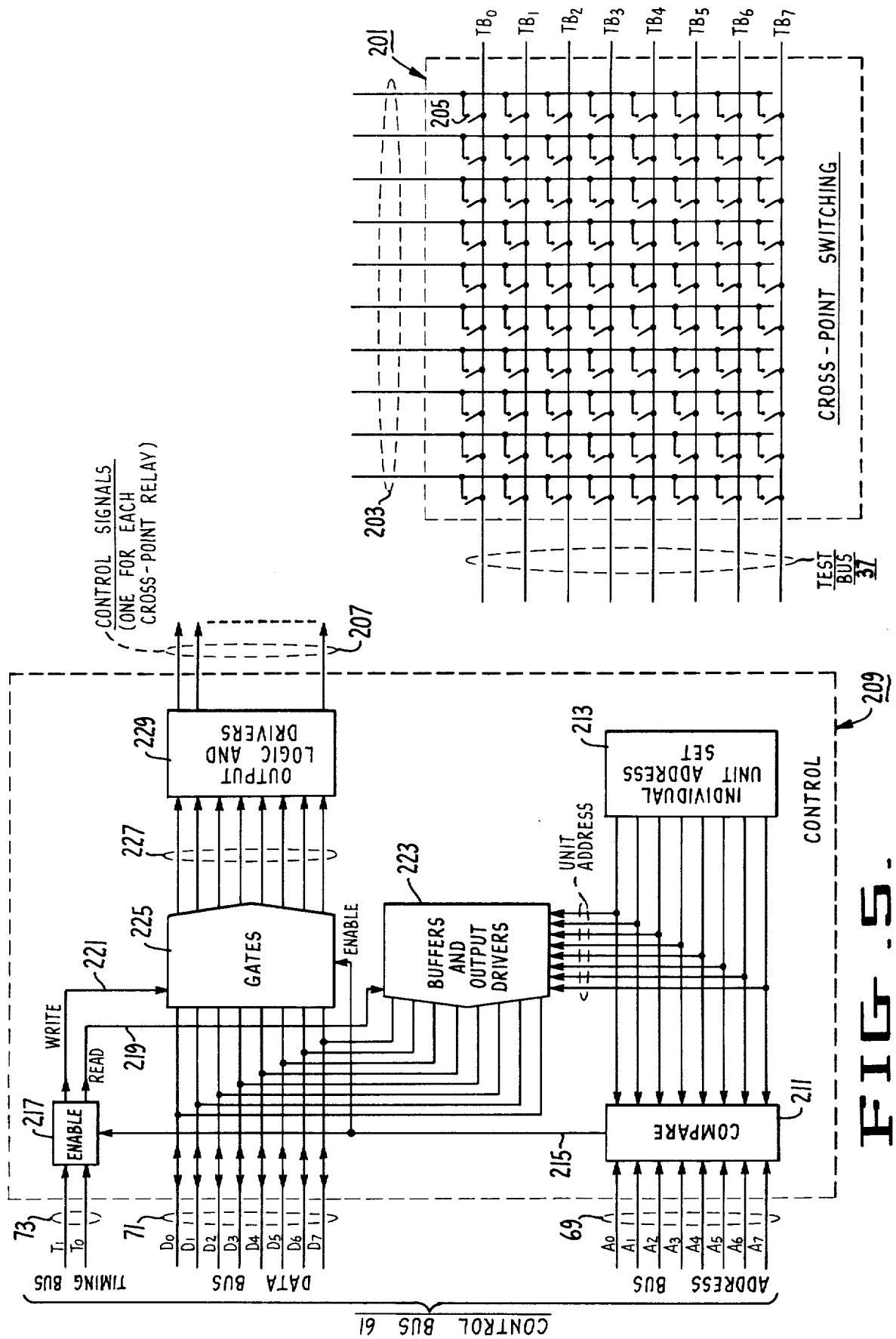
FIG. 5 is a schematic diagram of the form of an access concentrator or port concentrator switching block of the system of FIG. 1.

Referring to FIG. 5, the structure of another switching unit is described. Each of the access concentrators 29 and port concentrators 43 of FIG. 1 have the same structure so they are commonly illustrated with respect to FIG. 5. Each of them includes a cross point switching circuit 201 that connects any one of 10 circuits 203 to any one of the eight test bus circuits 37. It will be recognized, by referring to FIG. 3, that each of the circuits indicated in FIG. 5 within the block 201 as a single line actually contains 12 conductors. Each of the switch like elements, such as element 205, is a 12 pole relay having a relay coil that is energized in response to a signal in an appropriate one of the output lines 207 of a control circuit 209. There is one output line within the output circuits 207 that is uniquely connected to each of the relay coils of the switching circuit 201.

In order to obtain from the controller 63 (FIG. 1) over the control bus 61 a signal that calls for closing a particular cross point relay, the circuit 209 is connected to the address bus 69, data bus 71 and lines $T_1$ and $T_0$ of the timing bus 73. Many of the circuits connected directly to the control bus will be recognized to be similar to that described for a connector group with respect to FIG. 2. A comparator 211 receives all eight lines of the address bus and compares it with a unique address given to each unit through a manually adjustable switch 213. When the controller 63 (FIG. 1) sends on the address bus that particular unit address as set by the switch 213, a comparison signal is generated in a line 215. Such a comparison signal enables gating circuits 217 to permit passing the timing bus signals $T_0$ and $T_1$ from the controller 63 onto the "read" and "write" lines 219 and 221, respectively. As with the connector group of FIG. 2, the read and write signals in the control circuit 209 of FIG. 5 enable circuits 223 and 225, respectively, which are connected to the data bus 71.

The circuit 225 of FIG. 5, attached to all eight of the data bus lines, is a simple gating circuit that passes the signals on the data bus 71 through to its output lines 227 and onto additional logic circuits 229. Because of the nature of commercially available gating circuits, it is convenient to provide some enabling redundancy by connecting line 215 to the gating circuits 225 so that they will operate to pass on the data bus signals only when there is a positive comparison from the comparator 211 as well as a "write" signal in line 221.

The logic circuits 229 take the digital signal in the lines 227 and energize one of its output signal lines 207 depending upon the particular digital code presented in the lines 227. There are eighty individual circuits in the output 207, one for each of the cross point switching relays of the switching circuit 201, and the eight bit data bus code provides more than enough data capability to individually select one of the 80 relay coils at any one time.

The circuits 223 of the control circuit 209 of FIG. 5, apply the unique unit address as set by the switch 213 on to the data bus 71 in response to a read pulse in the line 219 from the controller 63 (FIG. 1). The circuits 223 also contain buffers and output drivers to provide a sufficient current to drive the cable capacitance of the data bus 71.

The function of sending the unique address from the switch 213 back to the controller 63 on the data bus provides a check that the switching unit thought to be connected to the data bus by the controller is actually so connected. This address verification has also previously been described to exist in the control circuitry of the connector group as shown in FIG. 2.

In communicating with the control circuit 209 of FIG. 5, the digital word applied through the data bus to initiate a particular cross-point connection contains a "0" in the $D_7$ line to connect the cross-point and a "1" to disconnect the cross-point by inhibiting the output logic and drivers 229. The address of the particular cross-point to be connected or disconnected is contained in the remaining seven bits (data bus lines $D_0$ through $D_6$). Bits $D_4$ through $D_6$ select a particular one of the test bus 37 and bits $D_0$ through $D_3$ select one of the circuits 203.

For individual unit addresses, the unit of FIG. 5, when employed as an access concentrator 29, is set to an individual unit address with address bits $A_0$ through $A_3$ being a "C" and bits $A_4$ through $A_7$ being 0-9 in hexadecimal code. When used as a port concentrator, the bits $A_0$ through $A_3$ on the address bus are set to be either an A or a B, in hexadecimal code, while the bits $A_4$ through $A_7$ are set to be a 0 in either case.

FIG. 6 illustrates the control portion of a test port, such as the control portion 55 of the test port 17 of FIG.

1, including panel switches and indicator lights. It will again be recognized that the circuits which enable communication between a test port and a controller 63 over the control bus are similar to those previously described with respect to FIGS. 2 and 5. A switch 231 is utilized to set a unique address for each of the test ports in an eight bit line 233. This eight bit line as well as the address bus 69 are applied to a comparator 235 which emits a comparison signal in a line 237 when indeed the two address signals compare in all eight bits. The existence of a comparison signal in the line 237 operates gates 239 to attach the unit to the timing bus 73, the $T_0$ timing bus line being passed through the gates 239 to a line 241 which carries the "read" pulse from the controller 63, a line 243 which carries a "write" pulse from the controller, a line 245 which communicates to the controller the existence or non-existence of a request to access a telephone circuit from that test port, and a line 247 which communicates to the controller the existence or non-existence of a service request by the operator at that test port.

In a manner similar to the control circuit previously described with respect to FIG. 2, the data bus 71 is connected in parallel to decoding circuits 249, which contain logic for interpreting words on the data bus 71 and provides certain outputs when certain specific data bus words exist, and to selection and driving circuits 251, which send requested information back to the controller over the data bus 71. The write pulse from the controller in the line 243 enables an output signal from the decoding circuits 249 according to the particular digital word presented to its input from the data bus 71. Similarly, a read pulse from the controller existing in the line 241 causes requested information to be read out at a different time onto the same data bus 71 from the selection circuits 251.

A principal function of a control panel at a test port is to permit the technician utilizing the test port to effect a good connection between the desired telephone circuit and the test jacks at the test port. This is accomplished by the technician setting, in ordinary numerals, the access point into an address dial 253 on the control panel. Each of the four digits shown on the address dial 253 of FIG. 6 is turned manually to a desired number between 0 and 9 by the operator. The left hand two digits of that panel dial are converted to an eight bit binary number in the eight output lines 255. Similarly, the set numerical value of the two right hand digits on the dial 253 are converted to an eight bit word on the eight lines 257. The conductors 255 and 257 are controllably connected to the data bus 71 for communication through the controller when the controller requests such information.

Referring to the table of FIG. 7, the structure and operation of the decoding circuits 249 and selection circuits 251 of FIG. 6 can best be explained. Referring initially to Instruction No. (1) of FIG. 7, the first data line across the top, the left hand column shows a digital signal which, when received on the data bus at a properly addressed test port, is detected by the decoding circuits 249 and results in a change in the signal level in a "send unit address" output line 259. The signal, connected to the selection circuits 251, cause the address set from the switch 231 to be applied to the data bus 71 when requested by a subsequent read pulse.

Instruction No. (2) of FIG. 7 causes the decoding circuits 249 to emit a signal in a "send CG address" line 261 which causes the selection circuits 251 to apply the connector group (CG) address on lines 255 dialed in by the operator to the data bus 71 and on to the controller 63 (FIG. 1). Similarly, referring to Instruction No. (3) of FIG. 7, the particular digital word there expressed causes the decoding circuits to emit a signal in a "send AP address" line 263 which similarly causes the selection circuits 251 to apply the digital signal in the lines 257 to the data bus 71 to indicate to the controller the remaining numerals that the operator has dialed into the address dial 253 on his test port control panel.

Besides dialing in the desired telephone circuit address on the dial 253 of FIG. 6, the operator utilizing the test port indicates that access is desired by depressing a push button 265. This provides a momentary signal to an access request circuit 267 which emits an output signal in the "access request" line 245 that is one state when the access button 265 has been depressed and which reverts to a second state when a release button 269, also on the test port control panel, is depressed by the operator. Through the line $T_2$ of the timing bus, this access request signal tells the controller 63 (FIG. 1) that it should make certain inquiries of the test port to determine the particular telephone circuit desired to be accessed and then to go through the procedure in communicating individually with each of the switching units and this test port as necessary to effect the requested access, as described more completely hereinafter with respect to FIGS. 8A and 8B.

In a similar manner, monitor and test push buttons 271 and 273 exist on the test port control panel and are connected to a service request circuit 275 that has as its output a service request line 247 with a signal level of one state or another, depending upon whether the monitor button 271 has just been pushed or whether the test button 273 has just been pushed by the technician.

The function to be accomplished by the monitor and test buttons 271 and 273 is to un-split or split a telephone circuit previously accessed. The spliting of a telephone circuit has been previously described with respect to FIGS. 2, 3 and 4. For this purpose, the state of the monitor and test switches 271 and 273 of FIG. 6 is communicated directly to the selection circuits 251 through respective "un-split circuit" and "split circuit" lines 277 and 279.

When the controller 63 receives the service request signal through its timing bus $T_3$ that indicates some service has been requested, such as by pushing the test button 273 to request spliting a previously accessed telephone circuit, it will ask the test port through a command on the data bus according to Instruction No. (4) of FIG. 7 to specify exactly what the service is that is being requested. When the decoding circuits 249 receive the request word in the left hand column of Instruction No. (4), it detects the word and causes a "send instruction" signal to be emitted over a line 281 to the selection circuits. The selection circuits 251 then cause one of the two data words to be sent over the data bus 71 as indicated on the right hand side of Instruction No. (4). Although only two service requests are shown in the embodiment of FIG. 6, this technique has the advantage of permitting a number of additional ones to be added if desired.

Referring to Instruction No. (5) of FIG. 7, the given digital word received by the test port of FIG. 6 on the data bus 71 causes a "check continuity" signal to be emitted in line 283 from the decoding circuits 249. This signal is applied to a continuity check circuit 285 of FIG. 6, this circuit being connected directly to the test bus 37 through the same conductors that are terminated in the test port test panel jacks. In any access of a telephone circuit, it is desired that the continuity of all of the switching connections made between the test port and the telephone circuit be checked.

Not only is it desirable to make sure that a good access has been accomplished so that subsequent tests on the telephone line will not be affected by some unknown malfunction in the switching circuits, but it is also highly desirable to verify proper connections before an accessed telephone line is split. A technician will not split an accessed telephone line until he verifies by monitoring the line that it is not in use at that instant. But to make sure that it is not in use, the technician needs to know that the telephone line has been properly accessed and that in fact he is listening to that telephone line and not merely hearing nothing because some relay didn't close in the switching circuit. Therefore, the continuity check circuits 285 apply a voltage to the same circuits that are brought to the test panel jacks of the test port. Any number of specific continuity check circuits could be utilized for the block 285, a preferred approach being to charge a number of capacitors, switch them across the various pairs of test bus circuit lines that are normally shorted before the access telephone line is split (see FIG. 3) and then the discharge time of the capacitors is monitored. If a capacitor does not discharge sufficiently fast in such a case then it will be known that the effective short circuit that should exist does not and that in fact there is not continuity between the test port jacks and the accessed telephone circuit.

The results of the continuity check, indicating either passing or failing, are applied to a logic gating circuit 287. After enough time for the continuity check to be made, the controller 63 (FIG. 1) will send another command indicated by Instruction No. (6) of FIG. 7 and the decoding circuits 249 are structured to emit a "send continuity results" signal in output line 289 to the logic gating circuit 287 in response thereto. When the send continuity result signal exists in the line 289, the circuits 287 are enabled to transfer the continuity check results from the block 285 through a line 291 to the selection circuits 251 for sending back on the data bus 71 to the controller one of the two digital words indicated at the right hand side of Instruction No. (6) of FIG. 7. As will become apparent hereinafter, the controller 63 (FIG. 1) then uses this information in its pre-programmed sequence of switching events to either terminate the attempt to access that particular telephone circuit or allow the access to remain connected.

The remaining communication from the controller to a test port, as indicated by Instruction No. (7) through (11) of FIG. 7, relate to lighting appropriate test panel lights at the test port of FIG. 6 to indicate to the technician the status of various events within the rest of the system, including the various switching units, which are being operated to make the desired connection between the test port and the desired telephone circuit. When a digital word indicated in line (7) of FIG. 7 is sent on the data bus 71 by the controller, a "busy" signal light 293 is caused to be energized by a signal in the line 295 from the decoding circuits 249. As described hereinafter with respect to FIGS. 8A and 8B, this busy signal is sent by the controller when all of the test buses 37 are in use or when the connector group necessary to access the desired telephone circuit is being used by some other test port.

Referring to Instruction No. (8) of FIG. 7, the data bus word there shown causes an "alarm" signal in the line 297 from the circuits 249 to energize an alarm light 299. Similarly, referring to Instruction No. (9), the data bus word there shown is decoded by the circuits 249 to emit a "wrong address" signal to be emitted in a line 301 for enabling an energization of a light 303. As is apparent from a study of the controller program flow chart of FIGS. 8A and 8B, the "alarm" signal is sent by the controller when, while attempting to communicate with the various test ports and switching units in the system to effect a particular connection, it somehow enables the wrong unit. This error is detected when the controller asks the unit to send back its address over the data bus and it is found not to match the address of the unit intended to be communicated with. The alarm light 299 is also illuminated if the continuity test results in a failure. The "wrong address" signal is sent out by the controller 63 (FIG. 1) to the test port when it is determined that the connector group addressed by the operator at the test port does not in fact exist, or when, if the connector group address does exist, it is determined that the relay circuit card within the connector group that would be connected to access the address telephone line is not in fact in the connector group (the "vacant" signal).

Two other indicator signals are sent from the controller over the data bus to the test port, these being indicated by Instruction Nos. (10) and (11) of FIG. 7. These instructions are part of the flag word that the controller has previously received from the individual relay circuit card that has been accessed as part of a connector group, as previously described. A "special circuit" signal is emitted in a line 305 by the decoding circuits 249 when the word given in the Instruction No. (10) is received thereby. This causes a test port panel light 307 to be lighted. Similarly, a "bridge termination" signal received by the controller over the data bus is caused by appropriate circuits in the decoding circuits 249 to be detected and indicated on a signal line 309. The existence of the bridge termination signal in the line 309 will cause, through a logic circuit 313, either a "terminated" panel light 311 or a "release" panel light 319 to be lighted depending upon a status condition indicated on two test bus lines 316. The buttons 315 and 317 communicate directly with a telephone circuit bridge termination, if it exists for the particular telephone circuit access, through the two test bus conductors 316.

If, during the time an access point in an addressed connector group is connected to test port jacks, the "terminate" button 315 is pushed, a command will be issued through the logic circuit 313 to the test bus conductors 316 to force the termination into the "terminated" state and light the "terminated" light 311. Similarly, if the "release" button 317 is pushed, a command is issued through the circuit 313 to force the termination into the "released" state and light the "released" light 319.

A telephone line bridge termination circuit 318 is illustrated in FIG. 3. A six pole latching relay and driver circuit 320 is caused to change its state in response to a signal in the lines 316 (FIGS. 3 and 6) of a test port which has accessed that particular telephone line. The relay of block 320 has six normally open contacts and six normally closed contacts, as shown as part of the circuit 318. When the relay is energized, the telephone circuit is split and the terminating resistances shown as part of the circuit 318 are connected across their respective pairs of the telephone lines on either side of the split. This permits a technician at a test port to isolate a telephone line that has failed, or to terminate and disconnect a noisy leg of a multi-point bridge circuit. The state of the bridge termination 318 of FIG. 3 remains unchanged even after that access point is dropped from connection with a particular test port. But its status is immediately revealed by the indicator light 311 or 319 (FIG. 6) as soon as that telephone line is again accessed by that test port. The technician can then change the status of the bridge termination by operating the buttons 315 and 317. The bridge circuit 318 is shown in FIG. 3 to be in a "released" state.

After a telephone circuit has been properly accessed, a "continuity pass" signal is developed by the logic circuits 287 in a separate line 321. The signal in the line 321 is applied to a gating circuit 323 from which monitor and test lights 325 and 327, respectively, on the test port control panel are enabled. Operation of the monitor or test buttons 271 and 273 causes the respective monitor or test lights 325 and 327 to be lighted, but only if the continuity pass signal exists in the line 321. The monitor light 325 lights as soon as the desired telephone circuit has been properly accessed and this tells the operator that he may go ahead and listen to the telephone line to see if it is being used and if not to conduct his test, including spliting the accessed telephone circuit by pushing the test button 273.

The structure of the switching system has been described as well as a great deal of its operation. But the sequence of events that have been discussed above is controlled by the program recorded permenantly on the memory 75 of the controller 63 (FIG. 1). This program is given in Exhibit 'A' hereto for a particular embodiment of the system being described and a flow chart of the operations of the controller 63 programmed by the program of Exhibit 'A' as given in FIGS. 8A and 8B. By referring to the program of Exhibit 'A' and the flow charts of FIGS. 8A and 8B the programmed operation of the controller 63 can be fully understood in great detail. It will be noted that the "LOC" column on the left hand side of the program of Exhibit 'A' identified memory locations which are also liberally identified on the flow chart of FIGS. 8A and 8B. But so that the more general reader can obtain an understanding of the program of the controller 63 (FIG. 1), its flow chart of FIGS. 8A and 8B are described generally.

The instruction box 401 of FIG. 8A indicates that the controller is sending out on the address bus 69 the address of the next test port ("TP") in order. One complete loop back to the beginning point 0023 of the program conducts operations of the entire system but with respect to one test port. After it completes the loop back to point 0023 of FIG. 8A, the controller then moves on to the next test port in order and gives that test port the controller's capability for effecting any requested switching operation.

Once a particular test port is addressed on the address bus 69, that test port's enable circuit 239 connects its access request ("AR") 245 and service request ("SR") 247 lines to the common timing bus 73 (FIG. 6). The controller 63 (FIG. 1) then, as part of the request box 403 of FIG. 8A, reads the access request and service request. Additionally, it requests the address ("ADDR") of that test port to be sent back on the data bus, according to Instruction No. (1), of FIG. 7. The controller then looks at the status ("STAT") of the access request signal and forms a special two bit word as indicated by the block 405 of FIG. 8A. The first bit of that word indicates the previous state of the access request; that is, the state of the access request the last time that that test port was interrogated by the controller. This state is remembered in the controller's internal memory. The second bit of this word is the present state of the access request of that particular test port being interrogated. For the flow chart of FIG. 8A and 8B, a "0" in any of these bit positions indicates that the test port has not requested or is not requesting access, while a "1" indicates that the test port has requested or is requesting access.

The controller, as indicated by block 405, then asks if this two bit status word is "00". If it is, it means that not only did the test port not request access the last time around but it has not requested access in the meantime so the controller returns through a line 407 to the beginning point 0023 of the program and starts over by addressing the next test port in sequence. However, if the status of this special two bit word is not "00", then the program goes on to the next block 408.

If the status of the special word is determined to be "11" at block 408, it means that the last time the test port was interrogated, access was being requested and no change is requested at the time of this interrogation. If the status is "11", the computer then looks, through block 409 at whether the service request ("SR") signal on test bus line T₃ indicates that some service is being requested by the operator. If not, the controller returns by line 411 to the beginning point 0023 and addresses the next test port in order. But if service is being requested as indicated on the timing bus bit T₃, the controller moves on to a sequence indicated by the block 413 which asks the test port what service it requests and then goes to the appropriate switching unit and effects that service.

As explained previously, the only service request provided in the example being described herein is to either split or un-split a previously accessed telephone circuit. Therefore, when the controller receives a service request bit on a line T₃ of the timing bus 73, it then sends to the test port a "send instruction" command indicated by Instruction No. (4) of FIG. 7. The controller then receives back on the data bus 71, as previously described, a word indicating either that the circuit is to be split or that it is to be un-split. The controller then drops its address of the test port and addresses the connector group ("CG") that has accessed the particular telephone line on a previous loop through this program. The particular connector group utilized is remembered in the microprocessor memory so long as the telephone circuit remains accessed through that connector group. The addressed connector group is then told through the data bus 71 by the controller to either split or un-split the accessed telephone circuit, according to Instruction Nos. (3) or (4) of FIG. 4. The instruction sent depends upon whether the monitor button 271 or test button 273 of the test port of FIG. 6 has been pushed by the operator since the last time that test port was interrogated. Once this is accomplished, the program loops back to the beginning point 0023 and addresses the next test port in order.

But if the status of this special two bit word is not "11", the program moves from the block 408 to another block 415 and asks whether the status of the word is "10". If so, this indicates that since the last time the test port was interrogated, the operator has pressed the release button 269 of the test port (FIG. 6) which he will do at the conclusion of a test on a particular accessed telephone line. The controller then proceeds to function as indicated by the block 417 to disconnect the previously connected port concentrator ("IC"), access concentrator ("OC") and connector group ("CG") (see FIG. 1). It does this by sequentially addressing on the address bus 69 each of these units and then commanding on the data bus by an appropriate word that the unit drop its previous relay connection. This command for the connector group is given in detail at Instruction No. (5) of FIG. 4. After the connector group access point and concentrator cross-points are disconnected, the controller 63 then moves to a function internal to it as indicated by the block 419 to clear its registers ("REGS") that have stored the number of the test port ("TP"), connector group ("CG") and test but ("TB") that were utilized in effecting the connection which has just been disconnected. Once this is done, the controller program returns to the beginning point 0023 and addresses the next test port in order.

If at the block 415 the controller 63 determines that the access request status word is not "10" then the only possible combination that is left is that the status word is "01" and thence the controller moves on to a function indicated by the block 421. Existence of the word "01" means that the operator at the addressed test port has depressed the access button 265 (FIG. 6) since the last time the test port was interrogated. Thus, the remaining part of the program of FIGS. 8A and 8B is to attempt a connection of the requested telephone circuit to that particular test port. The first step, as indicated by the block 421, is to compare the test port address received on the data bus 71 by the controller 63 with the address that it had sent out on the address bus 69. It will be recalled that the controller at block 403 of FIG. 8A had already requested that the test port send its unique unit address over the data bus, and now that comparison is made. If the comparison is not positive, then the controller operates as indicated by a block 423 to send an alarm ("ALM") to the test port that is addressed by the digital word on the address but 69. This is the Instruction No. (8) of FIG. 7. Subsequent to that, the existence of this alarm is stored ("ST") as indicated by a block 425 for later analysis of malfunctions of the system.

But if the comparison as performed by the data block 421 is positive, then the controller 63 moves on to its next operation as indicated by the block 427, which is to determine whether there is an available test bus, by referring to its own internal memory. If so, the controller will assign ("ASSGN") an available test bus for use in making the requested telephone circuit access, as indicated by the block 429. If all the test buses are busy, however, the controller then informs the test port of that fact by an operation indicated by the block 431, which amounts to sending to the addressed test port the Instruction No. (7) of FIG. 7.

Once a test bus ("TB") has been allocated and assigned by the controller 63, the controller, while still addressing the one test port, requests from it the address of the connector group to which the telephone line desired to be accessed is connected. This is indicated by the block 433 of FIG. 8A. This request has previously been explained with respect to Instruction No. (2) of FIG. 7. The controller 63 then determines, as indicated by a block 435, whether that particular connector group is busy or not, by referring to its own internal memory. If it is busy, then the controller operates as indicated by the block 431 to send a busy indication. This amounts to sending to the addressed test port the Instruction No. 7 of FIG. 7. The operator will have to try again at the next time it addresses that particular test port to make the connection. If the connector group is not busy, however, the controller then asks the addressed test port, as indicated by a block 437, what the access point ("AP") address of the desired telephone circuit is. This is Instruction No. (3) of FIG. 7.

Once the information is obtained by the controller as to the particular connector group and access point within that connector group that needs to be operated upon to effect a connection to the desired telephone circuit, the controller then addresses that connector group as indicated by the block 439. That is, the controller changes the digital word on the address bus 69 from the address of the particular test port of concern to the unique address of the one connector group which will provide access to the telephone circuit specified by the operator at the test port.

The controller then sends, as indicated by the block 441, the digital word of Instruction No. (1) of FIG. 4 on the data bus 71 which is received by the addressed connector group. The connector group then sends back on the data bus its unique address. If there is not such a connector group in the system, which is possible since it is only necessary to use the number of connector groups required for the number of telephone lines to be accessed, the data word sent back on the data bus will be all logic ones on the lines $D_0$ through $D_7$. As indicated by the block 443 of FIG. 8A, a receipt of such a signal causes the controller to operate as indicated by the block 445 to again address the requesting test port and send to it on the data bus a wrong address ("WA") signal according to Instruction No. (9) of FIG. 7. This causes the wrong address light 303 to indicate on the test port (FIG. 6). It also causes the controller to return to the beginning point 0023 of its program as indicated by FIG. 8A by addressing the next test port in sequence.

Assuming that there is the requested connector group as part of the system, the controller then moves to a function indicated by a block 447 of FIG. 8A to compare on the data bus the unique unit address of that connector group with the address that the controller 63 has previously placed on the address bus 69. If there is no comparison, it means that some how the wrong connector group has been connected to the data bus and before any further commands are sent the controller readdresses on the address bus 69 the requesting test port and sends on the data bus 71 the Instruction No. (8) of FIG. 7, indicated by the block 449. The fact that an alarm has occurred is stored in the controller memory, as indicated by the block 451, and then the controller addresses the next test port in sequence by returning to the beginning point 0023.

If there is a positive comparison of the received address on the data bus with the address on the address bus, the controller 63 then performs a BCD to binary code conversion of the access point ("AP") address, according to the block 453 of FIG. 8A. Subsequently, the controller sends out the command to the addressed connector group according to Instruction No. (2) of FIG. 4 to connect the particular access point that will give the test port operator access to the requested telephone line, as indicated by the block 455 of FIG. 8A.

But before any other switching operations are conducted, the controller wants to make sure that the access point actually exists within the addressed connector group. As explained previously, the connector group may not contain all of its relay printed circuit cards and if by chance an access point that would exist on a missing card is requested by the operator at the test port, then he needs to be told that fact. The controller performs this check by sending to the addressed connector group Instruction No. (6) of FIG. 4 which requests the connector group to send on the data bus the flag word which includes a vacant access point bit, as explained previously with respect to FIGS. 2 and 4. This step is indicated by the block 457 of FIG. 8A. The controller then looks, as indicated by the block 459, at that vacant bit of the flag word that is sent back to it on the data bus and if it indicates that the requested access point is vacant, then the controller will drop the requested connector group access point, as indicated by the block 461, and then send the wrong address ("WA") signal of Instruction No. (9) of FIG. 7 on the data bus to the given test port by again placing the unique address of that test port on the address bus 69.

If the vacant access point bit of the flag word indicates to the controller as part of the block operation 459 that it is not vacant, then the controller moves on to command the port concentrator "(IC") to which the test port is connected to connect that test port to the test bus that has previously been assigned by the controller according to the block 429 of FIG. 8A. This is accomplished by first addressing that port concentrator, indicated by block 465 of FIG. 8B, and comparing, as indicated by the block 467, the internally set unit address of that port concentrator appearing on the data bus with the address applied to the address bus by the controller 63. If the address comparison is favorable, the proper port concentrator cross-point is connected, as indicated by the block 469. If the comparison block 467 shows that the two addresses do not compare, the connector group access point previously connected is dropped, according to block 471 of FIG. 8B, by addressing the previously addressed connector group and sending Instruction No. (5) of FIG. 4 on the data bus. The requesting port is then addressed and sent an alarm signal according to Instruction No. (8) of FIG. 7, as indicated by a block 473 of FIG. 8A and the fact that an alarm has occurred is stored for future diagnostic investigation, as indicated by the block 475 of FIG. 8A. The controller then returns to the starting point 0023 of FIG. 8A and begins the sequence all over again by addressing the next test port in order.

But if a proper port concentrator is addressed and the correct cross-point relay energized, the next step that is accomplished by the controller 63 is to address the access concentrator ("OC") connected to the particular connector group which has just had its access point connected to the desired telephone circuit as previously indicated in the block 455 of FIG. 8A. The same general procedure is followed with respect to the access concentrator as was described with respect to the port concentrator, as is apparent from the set of operations indicated generally by the reference character 477 of FIG. 8B. If the proper access concentrator has been addressed on the address bus 69, then the output line (for example, line 27 of FIG. 1) of the previously connected connector group is connected to the assigned test bus by energizing the proper cross-point relay in the addressed access concentrator. If the address comparison fails, a sequence similar to that previously described with respect to blocks 471, 473 and 475 is accomplished, the only difference being the addition of the dropping of the previously connected port concentrator cross-point.

At this point, all of the necessary commands have been issued by the controller 63 to the various switching units to connect the desired telephone circuit to the one test port that is involved in a single loop of the operation of the controller illustrated in FIGS. 8A and 8B. But then the continuity test, as previously described with respect to FIGS. 6 and 7, is conducted as indicated by the set of instructions 479 of FIG. 8B. The test port is again addressed, as indicated by a block 481, and its unit address as received over the data bus is compared with the address that the controller 63 has sent out over the address bus, as indicated by the block 483. If the address comparison fails, a sequence similar to that previously described with respect to blocks 471, 473 and 475 is accomplished, the only difference being the addition of the dropping of the previously connected port concentrator ("IC") and access concentrator ("OC") cross-points. If the address comparison is positive, the controller 63 waits for a period of time (block 485) long enough to insure that the connector group access point and both concentrator cross-points have made connection. This delay is necessary because of the slow reaction time of the relays compared with the speed of the controller 63 in executing the program from block 455 of FIG. 8A to block 485 of FIG. 8B.

As part of the block 487, the controller sends out to the properly addressed test port over the data bus the Instruction Nos. (5) of FIG. 7. Subsequently, the controller sends out the Instruction No. (6) of FIG. 7, indicated by the block 489, asking the test port to send to it the results of the continuity test. If the results indicate that the continuity test passed as indicated in a block 491, then the path 493 is taken to keep the connections previously made. If the continuity test does not pass, however, the controller goes into a sequence of operations indicated generally by the reference number 495 to disconnect the connector group access point and the access concentrator and port concentrator cross-points that were previously connected in this one single loop of the controller program operation. No other connections made in some other loop with respect to some other test port are affected.

But when the continuity test passes, the registers within the microprocessor of the controller 63 are set, as indicated by the block 497, to record the particular test port, connector group and test bus that are being utilized to effect this connection. The controller 63 then communicates the special circuit and bridge termination flag bits, as indicated by Instruction Nos. (10) and (11) of FIG. 7, to the test port to give the operator the proper indication by lighting the appropriate control panel lights as described previously with respect to FIG. 6. After the flags are sent according to the block 499, the controller returns to its beginning point 0023 and addresses the next test port in order. This entire controller operation, although lengthy to explain takes less than one-tenth of a second.

The present invention has been described with respect to a preferred embodiment thereof but it will be understood that the invention is entitled to protection within the full scope of the claims which follow the appended computer programs marked as Exhibits 'A' and 'B'.

EXHIBIT 'A'

```
FAIRCHILD MICROSYSTEMS DIVISION - F8 NATIVE ASSEMBLY  (REV 2.0)
SAS LOCAL B PROG.#01/0100 8/6/76
ERRS  LOC  OBJECT  ADDR  LINE                SOURCE STATEMENT

0001         TITLE  'SAS LOCAL B PROG.#01/0100 8/6/76'
                          0002         ORG    0
      0000 63             0003         LISU   3
      0001 6F             0004         LISL   7
      0002 20FF           0005         LI     H'FF'
      0004 5D             0006  L1     LR     I,A
      0005 8FFE   0004    0007         BR7    L1
      0007 64             0008         LISU   4
      0008 70             0009         CLR
      0009 5D             0010  L2     LR     I,A
      000A 8FFE   0009    0011         BR7    L2
      000C 66             0012         LISU   6
      000D 5D             0013  L3     LR     I,A
      000E 8FFE   000D    0014         BR7    L3
      0010 65             0015         LISU   5
      0011 5D             0016  L4     LR     I,A
      0012 8FFE   0011    0017         BR7    L4
      0014 2A0800 0800    0018         DCI    H'800'
      0017 70             0019  L5     CLR
      0018 17             0020         ST
      0019 0E             0021         LR     Q,DC
      001A 03             0022         LR     A,QL
      001B 254A           0023         CI     H'4A'
      001D 94F9   0017    0024         BNZ    L5
      001F 20A0           0025  L6     LI     H'A0'
      0021 900F   0031    0026         BR     L8
      0023 40             0027  NXTP   LR     A,0    NEXT TP
      0024 25B9           0028         CI     H'B9'
      0026 84F8   001F    0029         BZ     L6
      0028 25A9           0030         CI     H'A9'
      002A 8404   002F    0031         BZ     L7
      002C 1F             0032         INC
      002D 9003   0031    0033         BR     L8
      002F 20B0           0034  L7     LI     H'B0'
      0031 50             0035  L8     LR     0,A
      0032 B0             0036         OUTS   0      ADDRESS TP
      0033 2090           0037         LI     H'90'  SND BOX ADDR
      0035 B1             0038         OUTS   1
      0036 76             0039         LIS    6
      0037 59             0040         LR     9,A
      0038 2802F0 02F0    0041         PI     WTRD
      003B 49             0042         LR     A,9
      003C 2160           0043         NI     H'60'
      003E 55             0044         LR     5,A    AR
      003F 49             0045         LR     A,9
      0040 2180           0046         NI     H'80'
      0042 56             0047         LR     6,A    SR
      0043 66             0048         LISU   6
      0044 6F             0049         LISL   7
      0045 40             0050  L9     LR     A,0
      0046 EE             0051         XS     D
      0047 840A   0052    0052         BZ     L10
      0049 8FFB   0045    0053         BF7    L9
      004B 45             0054         LR     A,5    PRST STATE00
      004C 2500           0055         CI     0
      004E 84D4   0023    0056         BZ     NXTP   TO 00
      0050 9021   0072    0057         BR     L12
      0052 45             0058  L10    LR     A,5
      0054 2500           0059         CI     0
      0055 840C   0062    0060         BZ     L11    TO 10
      0057 46             0061         LR     A,6
      0058 2500           0062         CI     0
      005A 84C8   0023    0063         BZ     NXTP   T3=0
      005C 2801C6 01C6    0064         PI     TBCG
      005F 2901DA 01DA    0065         JMP    SVCG
      0062 2801C6 01C6    0066  L11    PI     TBCG
      0065 72             0067         LIS    2      STATE 10
      0066 5B             0068         LR     11,A
      0067 2802AF 02AF    0069         PI     DROP
      006A 70             0070         LIS    0
```

```
FAIRCHILD MICROSYSTEMS DI  :ION - F8 NATIVE ASSEMBLE   REV 2.0
SAS LOCAL 6 PROG.#01/0100  /76
ERRS  LOC OBJECT ADDR LINE              SOURCE STATEMENT 006B 59              0071          LR    9,A
      006C 280276 0276 0072              PI    SERS
      006F 290023 0023 0073              JMP   NXTP
      0072 4A              0074  L12     LR    A,10    STATE 01
      0073 E0              0075          XS    0
      0074 8409   007E 0076              BZ    L13
      0076 280224 0224 0077              PI    ALRM    NO COMP
      0079 71              0078          LIS   1
      007A 59              0079          LR    9,A
      007B 29026A 026A 0080              JMP   STAL
      007E 44              0081  L13     LR    A,4
      007F 1F              0082          INC
      0080 2107            0083          NI    7
      0082 2420            0084          AI    H'20'
      0084 59              0085          LR    9,A
      0085 0B              0086          LR    IS,A
      0086 71              0087  L14     LIS   1
      0087 ED              0088          XS    I
      0088 8409   0092 0089              BZ    L15
      008A 0A              0090          LR    A,IS
      008B 24FF            0091          AI    H'FF'
      008D 2107            0092          NI    7
      008F 54              0093          LR    4,A     ASSIGN TB
      0090 9008   0099 0094              BR    L16
      0092 0A              0095  L15     LR    A,IS
      0093 E9              0096          XS    9
      0094 94F1   0086 0097              BNZ   L14
      0096 2902A2 02A2 0098              JMP   BSY     TB BUSY
      0099 0B              0099  L16     LR    IS,A
      009A 65              0100          LISU  5
      009B 4C              0101          LR    A,S
      009C 2501            0102          CI    1       TBC=1
      009E 9403   00A2 0103              BNZ   L17
      00A0 1F              0104          INC
      00A1 5C              0105          LR    S,A
      00A2 2010            0106  L17     LI    H'10'
      00A4 B1              0107          OUTS  1
      00A5 76              0108          LIS   6
      00A6 59              0109          LR    9,A
      00A7 2802F0 02F0 0110              PI    WTRD    CG IN R10
      00AA 63              0111          LISU  3
      00AB 6F              0112          LISL  7
      00AC 4A              0113  L18     LR    A,10
      00AD ED              0114          XS    I
      00AE 9404   00B3 0115              BNZ   L19
      00B0 2902A2 02A2 0116              JMP   BSY     CG BUSY
      00B3 8FF8   00AC 0117  L19         BR7   L18
      00B5 4A              0118          LR    A,10    CG AVAIL
      00B6 51              0119          LR    1,A     ST CG
      00B7 2020            0120          LI    H'20'
      00B9 B1              0121          OUTS  1
      00BA 76              0122          LIS   6
      00BB 59              0123          LR    9,A
      00BC 2802F0 02F0 0124              PI    WTRD
      00BF 4A              0125          LR    A,10
      00C0 52              0126          LR    2,A     ST AP
      00C1 41              0127          LR    A,1
      00C2 B0              0128          OUTS  0       ADDRESS CG
      00C3 2090            0129          LI    H'90'   SND BOX ADDR
      00C5 B1              0130          OUTS  1
      00C6 76              0131          LIS   6
      00C7 59              0132          LR    9,A
      00C8 2902F0 02F0 0133              PI    WTRD
      00CB 4A              0134          LR    A,10    READ BOX ADDR
      00CC 25FF            0135          CI    H'FF'
      00CE 9404   00D3 0136              BNZ   L20
      00D0 290231 0231 0137              JMP   SDWA    WA
      00D3 E1              0138  L20     XS    1
      00D4 8409   00DE 0139              BZ    L21
      00D6 280224 0224 0140              PI    ALRM
      00D9 72              0141          LIS   2       ST CG ALRM
```

FAIRCHILD MICROSYSTEMS DIVISION - F8 NATIVE ASSEMBL (REV 2.0)
SAS LOCAL B PROG.#01/0100 6/6/76

| ERRS | LOC | OBJECT | ADDR | LINE | | SOURCE STATEMENT | | |
|---|---|---|---|---|---|---|---|---|
| | 00DA | 59 | | 0142 | | LR | 9,A | |
| | 00DB | 29026A | 026A | 0143 | | JMP | STAL | |
| | 00DE | 200F | | 0144 | L21 | LI | H'F' | BCD TO BI |
| | 00E0 | F2 | | 0145 | | NS | 2 | |
| | 00E1 | 53 | | 0146 | | LR | 3,A | |
| | 00E2 | 42 | | 0147 | | LR | A,2 | |
| | 00E3 | 14 | | 0148 | | SR | 4 | |
| | 00E4 | 59 | | 0149 | | LR | 9,A | MSD BCD |
| | 00E5 | 2500 | | 0150 | L22 | CI | 0 | |
| | 00E7 | 8409 | 00F1 | 0151 | | BZ | L23 | |
| | 00E9 | 200A | | 0152 | | LI | H'A' | |
| | 00EB | C3 | | 0153 | | AS | 3 | |
| | 00EC | 53 | | 0154 | | LR | 3,A | BI AP |
| | 00ED | 39 | | 0155 | | DS | 9 | |
| | 00EE | 49 | | 0156 | | LR | A,9 | |
| | 00EF | 90F5 | 00E5 | 0157 | | BR | L22 | |
| | 00F1 | 43 | | 0158 | L23 | LR | A,3 | |
| | 00F2 | B1 | | 0159 | | OUTS | 1 | |
| | 00F3 | 7E | | 0160 | | LIS | H'E' | |
| | 00F4 | 59 | | 0161 | | LR | 9,A | |
| | 00F5 | 2802F0 | 02F0 | 0162 | | PI | WTRD | CONN AP |
| | 00F8 | 71 | | 0163 | | LIS | H'01' | 3.5 MS DELAY |
| | 00F9 | 59 | | 0164 | | LR | 9,A | |
| | 00FA | 2801D0 | 01D0 | 0165 | | PI | TDLY | |
| | 00FD | 2088 | | 0166 | | LI | H'88' | SEND FLAGS |
| | 00FF | B1 | | 0167 | | OUTS | 1 | |
| | 0100 | 76 | | 0168 | | LIS | 6 | |
| | 0101 | 59 | | 0169 | | LR | 9,A | |
| | 0102 | 2802F0 | 02F0 | 0170 | | PI | WTRD | |
| | 0105 | 4A | | 0171 | | LR | A,10 | RCV FLAGS |
| | 0106 | 57 | | 0172 | | LR | 7,A | ST FLAGS |
| | 0107 | 2110 | | 0173 | | NI | H'10' | |
| | 0109 | 8409 | 0113 | 0174 | | BZ | L24 | |
| | 010B | 70 | | 0175 | | CLR | | VACANT |
| | 010C | 5B | | 0176 | | LR | 11,A | |
| | 010D | 2802AF | 02AF | 0177 | | PI | DROP | |
| | 0110 | 290231 | 0231 | 0178 | | JMP | SDWA | |
| | 0113 | 40 | | 0179 | L24 | LR | A,0 | |
| | 0114 | 14 | | 0180 | | SR | 4 | |
| | 0115 | 5B | | 0181 | | LR | 11,A | IC IN R11 |
| | 0116 | B0 | | 0182 | | OUTS | 0 | ADDRESS IC |
| | 0117 | 7A | | 0183 | | LIS | H'A' | |
| | 0118 | B1 | | 0184 | | OUTS | 1 | |
| | 0119 | 76 | | 0185 | | LIS | 6 | |
| | 011A | 59 | | 0186 | | LR | 9,A | |
| | 011B | 2802F0 | 02F0 | 0187 | | PI | WTRD | |
| | 011E | 4A | | 0188 | | LR | A,10 | |
| | 011F | EB | | 0189 | | XS | 11 | |
| | 0120 | 840E | 012F | 0190 | | BZ | L25 | NO COMP |
| | 0122 | 70 | | 0191 | | CLR | | |
| | 0123 | 5B | | 0192 | | LR | 11,A | |
| | 0124 | 2802AF | 02AF | 0193 | | PI | DROP | |
| | 0127 | 280224 | 0224 | 0194 | | PI | ALRM | |
| | 012A | 74 | | 0195 | | LIS | 4 | ST IC ALRM |
| | 012B | 59 | | 0196 | | LR | 9,A | |
| | 012C | 29026A | 026A | 0197 | | JMP | STAL | |
| | 012F | 44 | | 0198 | L25 | LR | A,4 | CONN IC |
| | 0130 | 15 | | 0199 | | SL | 4 | |
| | 0131 | 59 | | 0200 | | LR | 9,A | |
| | 0132 | 40 | | 0201 | | LR | A,0 | |
| | 0133 | 210F | | 0202 | | NI | H'F' | |
| | 0135 | C9 | | 0203 | | AS | 9 | |
| | 0136 | B1 | | 0204 | | OUTS | 1 | |
| | 0137 | 7E | | 0205 | | LIS | H'E' | |
| | 0138 | 59 | | 0206 | | LR | 9,A | |
| | 0139 | 2802F0 | 02F0 | 0207 | | PI | WTRD | |
| | 013C | 41 | | 0208 | | LR | A,1 | |
| | 013D | 21F0 | | 0209 | | NI | H'F0' | |
| | 013F | 240C | | 0210 | | AI | H'C' | |
| | 0141 | 5B | | 0211 | | LR | 11,A | ST OC IN R11 |
| | 0142 | B0 | | 0212 | | OUTS | 0 | ADDRESS OC |
| | 0143 | 7A | | 0213 | | LIS | H'A' | |

FAIRCHILD MICROSYSTEMS 1   SION - F8 NATIVE ASSEMBL   (REV 2.0)
SAS LOCAL B PROG.#01/0100  3/6/76
ERRS  LOC OBJECT ADDR LINE              SOURCE STATEMENT

```
      0144 B1            0214         OUTS   1
      0145 76            0215         LIS    6
      0146 59            0216         LR     9,A
      0147 2802F0 02F0   0217         PI     WTRD
      014A 4A            0218         LR     A,10
      014B EB            0219         XS     11
      014C 840E  015B    0220         BZ     L26
      014E 71            0221         LIS    1         NO COMP
      014F 5B            0222         LR     11,A
      0150 2802AF 02AF   0223         PI     DROP      DROP IC, CG
      0153 280224 0224   0224         PI     ALRM
      0156 78            0225         LIS    8         ST OC ALRM
      0157 59            0226         LR     9,A
      0158 29026A 026A   0227         JMP    STAL
      015B 41            0228  L26    LR     A,1       CONN OC
      015C 210F          0229         NI     H'F'
      015E 59            0230         LR     9,A
      015F 44            0231         LR     A,4
      0160 15            0232         SL     4
      0161 C9            0233         AS     9
      0162 B1            0234         OUTS   1
      0163 7E            0235         LIS    H'E'
      0164 59            0236         LR     9,A
      0165 2802F0 02F0   0237         PI     WTRD
      0168 40            0238         LR     A,0       ADDRESS TP
      0169 B0            0239         OUTS   0
      016A 2090          0240         LI     H'90'
      016C B1            0241         OUTS   1
      016D 76            0242         LIS    6
      016E 59            0243         LR     9,A
      016F 2802F0 02F0   0244         PI     WTRD
      0172 4A            0245         LR     A,10
      0173 E0            0246         XS     0
      0174 840E  0183    0247         BZ     L27
      0176 72            0248         LIS    2         NO COMP
      0177 5B            0249         LR     11,A
      0178 2802AF 02AF   0250         PI     DROP
      017B 280224 0224   0251         PI     ALRM      ALARM
      017E 71            0252         LIS    1         ST TP ALRM
      017F 59            0253         LR     9,A
      0180 29026A 026A   0254         JMP    STAL
      0183 73            0255  L27    LIS    3         CT TEST
      0184 59            0256         LR     9,A       10MS
      0185 2801D0 01D0   0257         PI     TDLY
      0188 2040          0258         LI     H'40'
      018A B1            0259         OUTS   1
      018B 74            0260         LIS    4         D LINE
      018C B5            0261         OUTS   5
      018D 7A            0262         LIS    H'A'      35MS
      018E 59            0263         LR     9,A
      018F 2801D0 01D0   0264         PI     TDLY
      0192 2070          0265         LI     H'70'     SEND CT RESLTS
      0194 B1            0266         OUTS   1
      0195 74            0267         LIS    4
      0196 B5            0268         OUTS   5
      0197 7A            0269         LIS    H'A'      35MS
      0198 59            0270         LR     9,A
      0199 2801D0 01D0   0271         PI     TDLY
      019C 76            0272         LIS    6
      019D 59            0273         LR     9,A
      019E 2802F0 02F0   0274         PI     WTRD
      01A1 4A            0275         LR     A,10
      01A2 2501          0276         CI     1
      01A4 9410  01B5    0277         BNZ    L28
      01A6 71            0278         LIS    1         CT PASS
      01A7 59            0279         LR     9,A
      01A8 280276 0276   0280         PI     SERS
      01AB 47            0281         LR     A,7
      01AC B1            0282         OUTS   1         SND FLAGS
      01AD 7E            0283         LIS    H'E'
      01AE 59            0284         LR     9,A
      01AF 2802F0 02F0   0285         PI     WTRD
```

FAIRCHILD MICROSYSTEMS D  SION - F8 NATIVE ASSEMBL   (REV 2.0)
SAS LOCAL B PROG.#01/0100   /76

| ERRS | LOC | OBJECT | ADDR | LINE | | | SOURCE STATEMENT | |
|---|---|---|---|---|---|---|---|---|
| | 01B2 | 290023 | 0023 | 0286 | | JMP | NXTP | |
| | 01B5 | 28023E | 023E | 0287 | L28 | PI | STCT | CT FAIL |
| | 01B8 | 72 | | 0288 | L30 | LIS | 2 | DROP,DELETED L29 |
| | 01B9 | 5B | | 0289 | | LR | 11,A | |
| | 01BA | 2802AF | 02AF | 0290 | | PI | DROP | |
| | 01BD | 280224 | 0224 | 0291 | | PI | ALRM | ALRM TP |
| | 01C0 | 2010 | | 0292 | | LI | H'10' | ST CT ALM |
| | 01C2 | 59 | | 0293 | | LR | 9,A | |
| | 01C3 | 29026A | 026A | 0294 | | JMP | STAL | |
| | 01C6 | 0A | | 0295 | TBCG | LR | A,IS | |
| | 01C7 | 1F | | 0296 | | INC | | |
| | 01C8 | 2107 | | 0297 | | NI | 7 | |
| | 01CA | 54 | | 0298 | | LR | 4,A | PTB |
| | 01CB | 0B | | 0299 | | LR | IS,A | |
| | 01CC | 63 | | 0300 | | LISU | 3 | |
| | 01CD | 4C | | 0301 | | LR | A,S | |
| | 01CE | 51 | | 0302 | | LR | 1,A | PCG |
| | 01CF | 1C | | 0303 | | POP | | |
| | 01D0 | 70 | | 0304 | TDLY | CLR | | T=(3.5XR9)MS |
| | 01D1 | 1F | | 0305 | TD1 | INC | | |
| | 01D2 | 25FA | | 0306 | | CI | H'FA' | |
| | 01D4 | 94FC | 01D1 | 0307 | | BNZ | TD1 | |
| | 01D6 | 39 | | 0308 | | DS | 9 | |
| | 01D7 | 94F8 | 01D0 | 0309 | | BNZ | TDLY | |
| | 01D9 | 1C | | 0310 | | POP | | |
| | 01DA | 4A | | 0311 | SVCG | LR | A,10 | |
| | 01DB | E0 | | 0312 | | XS | 0 | |
| | 01DC | 8413 | 01F0 | 0313 | | BZ | SV1 | |
| | 01DE | 72 | | 0314 | | LIS | 2 | |
| | 01DF | 5B | | 0315 | | LR | 11,A | |
| | 01E0 | 2802AF | 02AF | 0316 | | PI | DROP | |
| | 01E3 | 70 | | 0317 | | LIS | 0 | |
| | 01E4 | 59 | | 0318 | | LR | 9,A | |
| | 01E5 | 280276 | 0276 | 0319 | | PI | SERS | |
| | 01E8 | 280224 | 0224 | 0320 | | PI | ALRM | ALRM |
| | 01EB | 71 | | 0321 | | LIS | 1 | |
| | 01EC | 59 | | 0322 | | LR | 9,A | |
| | 01ED | 29026A | 026A | 0323 | | JMP | STAL | |
| | 01F0 | 2030 | | 0324 | SV1 | LI | H'30' | |
| | 01F2 | B1 | | 0325 | | OUTS | 1 | |
| | 01F3 | 76 | | 0326 | | LIS | 6 | |
| | 01F4 | 59 | | 0327 | | LR | 9,A | |
| | 01F5 | 2802F0 | 02F0 | 0328 | | PI | WTRD | |
| | 01F8 | 4A | | 0329 | | LR | A,10 | |
| | 01F9 | 5B | | 0330 | | LR | 11,A | SVC INS IN R11 |
| | 01FA | 41 | | 0331 | | LR | A,1 | |
| | 01FB | B0 | | 0332 | | OUTS | 0 | |
| | 01FC | 2090 | | 0333 | | LI | H'90' | |
| | 01FE | B1 | | 0334 | | OUTS | 1 | |
| | 01FF | 76 | | 0335 | | LIS | 6 | |
| | 0200 | 59 | | 0336 | | LR | 9,A | |
| | 0201 | 2802F0 | 02F0 | 0337 | | PI | WTRD | |
| | 0204 | 4A | | 0338 | | LR | A,10 | |
| | 0205 | E1 | | 0339 | | XS | 1 | |
| | 0206 | 8413 | 021A | 0340 | | BZ | SV2 | |
| | 0208 | 72 | | 0341 | | LIS | 2 | |
| | 0209 | 5B | | 0342 | | LR | 11,A | |
| | 020A | 2802AF | 02AF | 0343 | | PI | DROP | |
| | 020D | 70 | | 0344 | | LIS | 0 | |
| | 020E | 59 | | 0345 | | LR | 9,A | |
| | 020F | 280276 | 0276 | 0346 | | PI | SERS | |
| | 0212 | 280224 | 0224 | 0347 | | PI | ALRM | |
| | 0215 | 72 | | 0348 | | LIS | 2 | |
| | 0216 | 59 | | 0349 | | LR | 9,A | |
| | 0217 | 29026A | 026A | 0350 | | JMP | STAL | |
| | 021A | 4B | | 0351 | SV2 | LR | A,11 | SVC CG |
| | 021B | B1 | | 0352 | | OUTS | 1 | |
| | 021C | 7E | | 0353 | | LIS | H'E' | |
| | 021D | 59 | | 0354 | | LR | 9,A | |
| | 021E | 2802F0 | 02F0 | 0355 | | PI | WTRD | |
| | 0221 | 290023 | 0023 | 0356 | | JMP | NXTP | |
| | 0224 | 08 | | 0357 | ALRM | LR | K,P | |

FAIRCHILD MICROSYSTEMS DIVISION - F8 NATIVE ASSEMBL. (REV 2.0)
SAS LOCAL B PROG.#01/0100 /76
ERRS LOC OBJECT ADDR LINE                SOURCE STATEMENT

```
0225 40            0358            LR      A,0
0226 B0            0359            OUTS    0
0227 2060          0360            LI      H'60'
0229 B1            0361            OUTS    1
022A 7E            0362            LIS     H'E'
022B 59            0363            LR      9,A
022C 2802F0 02F0   0364            PI      WTRD
022F 09            0365            LR      P,K
0230 1C            0366            POP
0231 40            0367   SDWA     LR      A,0
0232 B0            0368            OUTS    0
0233 2080          0369            LI      H'80'
0235 B1            0370            OUTS    1
0236 7E            0371            LIS     H'E'
0237 59            0372            LR      9,A
0238 2802F0 02F0   0373            PI      WTRD
023B 290023 0023   0374            JMP     NXTP
023E 2A000A 000A   0375   STCT     DCI     H'00A'
0241 0E            0376            LR      Q,DC
0242 16            0377            LM
0243 250A          0378            CI      H'A'
0245 8420 0266     0379            BZ      ST1
0247 2420          0380            AI      H'20'
0249 5B            0381            LR      11,A
024A 78            0382            LIS     8
024B 5A            0383            LR      10,A
024C 10            0384            LR      DC,H
024D 40            0385            LR      A,0
024E 17            0386            ST
024F 0F            0387            LR      DC,Q
0250 16            0388            LM
0251 2430          0389            AI      H'30'
0253 5B            0390            LR      11,A
0254 10            0391            LR      DC,H
0255 41            0392            LR      A,1
0256 17            0393            ST
0257 0F            0394            LR      DC,Q
0258 16            0395            LM
0259 2440          0396            AI      H'40'
025B 5B            0397            LR      11,A
025C 10            0398            LR      DC,H
025D 44            0399            LR      A,4
025E 17            0400            ST
025F 0F            0401            LR      DC,Q
0260 16            0402            LM
0261 1F            0403            INC
0262 0F            0404            LR      DC,Q
0263 17            0405            ST
0264 9004 0269     0406            BR      ST2
0266 2020          0407   ST1      LI      H'20'
0268 17            0408            ST
0269 1C            0409   ST2      POP
026A 40            0410   STAL     LR      A,0
026B 211F          0411            NI      H'1F'
026D 07            0412            LR      QL,A
026E 78            0413            LIS     8
026F 06            0414            LR      QU,A
0270 0F            0415            LR      DC,Q
0271 49            0416            LR      A,9
0272 17            0417            ST
0273 290023 0023   0418            JMP     NXTP
0276 44            0419   SERS     LR      A,4
0277 0B            0420            LR      IS,A
0278 66            0421            LISU    6
0279 49            0422            LR      A,9
027A 2500          0423            CI      0
027C 8405 0282     0424            BZ      SE5
027E 40            0425            LR      A,0
027F 5C            0426            LR      S,A      ST TP
0280 9003 0284     0427            BR      SE1
0282 70            0428   SE5      CLR
0283 5C            0429            LR      S,A      RESET TP
```

FAIRCHILD MICROSYSTEMS DIVISION - F8 NATIVE ASSEMBL. (REV 2.0)
SAS LOCAL B PROG.#01/0100 . /76              SOURCE STATEMENT
ERRS LOC OBJECT ADDR LINE

```
     0284 44              0430  SE1    LR     A,4
     0285 0B              0431         LR     IS,A
     0286 63              0432         LISU   3
     0287 49              0433         LR     A,9
     0288 2500            0434         CI     0
     028A 8405      0290  0435         BZ     SE2
     028C 41              0436         LR     A,1
     028D 5C              0437         LR     S,A            ST CG
     028E 9004      0293  0438         BR     SE3
     0290 20FF            0439  SE2    LI     H'FF'          RESET CG
     0292 5C              0440         LR     S,A
     0293 44              0441  SE3    LR     A,4
     0294 0B              0442         LR     IS,A
     0295 64              0443         LISU   4
     0296 49              0444         LR     A,9
     0297 5C              0445         LR     S,A            S/R TB
     0298 2501            0446         CI     1
     029A 9406      02A1  0447         BNZ    SE4
     029C 44              0448         LR     A,4            RESET TBC
     029D 0B              0449         LR     IS,A
     029E 65              0450         LISU   5
     029F 70              0451         CLR
     02A0 5C              0452         LR     S,A
     02A1 1C              0453  SE4    POP
     02A2 40              0454  BSY    LR     A,0
     02A3 B0              0455         OUTS   0
     02A4 2050            0456         LI     H'50'
     02A6 B1              0457         OUTS   1
     02A7 7E              0458         LIS    H'E'
     02A8 59              0459         LR     9,A
     02A9 2802F0    02F0  0460         PI     WTRD
     02AC 290023   0023   0461         JMP    NXTP
     02AF 08              0462  DROP   LR     K,P
     02B0 41              0463         LR     A,1
     02B1 B0              0464         OUTS   0
     02B2 2082            0465         LI     H'82'          UN-SPLIT
     02B4 B1              0466         OUTS   1
     02B5 7E              0467         LIS    H'E'
     02B6 59              0468         LR     9,A
     02B7 2802F0    02F0  0469         PI     WTRD
     02BA 77              0470         LIS    7              25MS
     02BB 59              0471         LR     9,A
     02BC 2801D0    01D0  0472         PI     TDLY
     02BF 2084            0473         LI     H'84'          CG
     02C1 B1              0474         OUTS   1
     02C2 7E              0475         LIS    H'E'
     02C3 59              0476         LR     9,A
     02C4 2802F0    02F0  0477         PI     WTRD
     02C7 4B              0478         LR     A,11
     02C8 2500            0479         CI     0
     02CA 8423     02EE   0480         BZ     DR1
     02CC 40              0481         LR     A,0
     02CD 14              0482         SR     4
     02CE B0              0483         OUTS   0
     02CF 40              0484         LR     A,0            IC
     02D0 218F            0485         NI     H'8F'
     02D2 B1              0486         OUTS   1
     02D3 7E              0487         LIS    H'E'
     02D4 59              0488         LR     9,A
     02D5 2802F0    02F0  0489         PI     WTRD
     02D8 4B              0490         LR     A,11
     02D9 2501            0491         CI     1
     02DB 8412     02EE   0492         BZ     DR1
     02DD 41              0493         LR     A,1
     02DE 21F0            0494         NI     H'F0'
     02E0 240C            0495         AI     H'C'
     02E2 B0              0496         OUTS   0
     02E3 41              0497         LR     A,1
     02E4 210F            0498         NI     H'F'
     02E6 2280            0499         OI     H'80'
     02E8 B1              0500         OUTS   1
     02E9 7E              0501         LIS    H'E'
```

```
ERRS  LOC  OBJECT  ADDR  LINE               SOURCE STATEMENT

02EA 59             0502           LR    9,A
      02EB 2802F0 02F0    0503           PI    WTRD
      02EE 09             0504   DR1     LR    P,K
      02EF 1C             0505           POP
      02F0 74             0506   WTRD    LIS   4
      02F1 B5             0507           OUTS  5
      02F2 70             0508   WT1     CLR
      02F3 1F             0509   WT2     INC
      02F4 253F           0510           CI    H'3F'
      02F6 94FC   02F3    0511           BNZ   WT2
      02F8 49             0512           LR    A,9
      02F9 B5             0513           OUTS  5
      02FA 70             0514           CLR
      02FB 1F             0515   WT3     INC
      02FC 253F           0516           CI    H'3F'
      02FE 94FC   02FB    0517           BNZ   WT3
      0300 49             0518           LR    A,9
      0301 250E           0519           CI    H'E'
      0303 841E   0322    0520           BZ    WT5
      0305 2506           0521           CI    6
      0307 9412   031A    0522           BNZ   WT4
      0309 71             0523           LIS   1
      030A 59             0524           LR    9,A
      030B 74             0525           LIS   H'04'
      030C B5             0526           OUTS  5
      030D 20FF           0527           LI    H'FF'
      030F B1             0528           OUTS  1
      0310 70             0529           CLR
      0311 1F             0530   WTA     INC
      0312 253F           0531           CI    H'3F'
      0314 94FC   0311    0532           BNZ   WTA
      0316 70             0533           CLR
      0317 B5             0534           OUTS  5
      0318 90D9   02F2    0535           BR    WT1
      031A 70             0536   WT4     CLR
      031B B1             0537           OUTS  1
      031C 71             0538           LIS   1
      031D B5             0539           OUTS  5
      031E A1             0540           INS   1
      031F 5A             0541           LR    10,A
      0320 A5             0542           INS   5
      0321 59             0543           LR    9,A
      0322 70             0544   WT5     CLR
      0323 B5             0545           OUTS  5
      0324 1C             0546           POP
                          0547           END
```

```
SYMBOL  TYP  RL  VAL   REFERENCES

ILRM    L    01  0224  0347  0320  0291  0251  0224  0194  0140  0077
SY      L    01  02A2  0116  0098
RI      L    01  02EE  0492  0480
ROP     L    01  02AF  0343  0316  0290  0250  0223  0193  0177  0069
1       L    01  0004  0007
10      L    01  0052  0052
11      L    01  0062  0060
12      L    01  0072  0057
13      L    01  007E  0076
14      L    01  0086  0097
15      L    01  0092  0089
16      L    01  0099  0094
17      L    01  00A2  0103
18      L    01  00AC  0117
19      L    01  00B3  0115
2       L    01  0009  0011
20      L    01  00D3  0136
21      L    01  00DE  0139
22      L    01  00E5  0157
```

FAIRCHILD MICROSYSTEMS DIVISION - F8 NATIVE ASSEMBLER (REV 2.0)
SAS LOCAL B PROG.#01/0100  /76
SYMBOL TYP RL  VAL         REFERENCES

| SYMBOL | TYP | RL | VAL | REFERENCES | | | | | | | |
|---|---|---|---|---|---|---|---|---|---|---|---|
| L23  | L | 01 | 00F1 | 0151 | | | | | | | |
| L24  | L | 01 | 0113 | 0174 | | | | | | | |
| L25  | L | 01 | 012F | 0190 | | | | | | | |
| L26  | L | 01 | 015B | 0220 | | | | | | | |
| L27  | L | 01 | 0183 | 0247 | | | | | | | |
| L28  | L | 01 | 0185 | 0277 | | | | | | | |
| L3   | L | 01 | 000D | 0014 | | | | | | | |
| L30  | L | 01 | 01B8 |      | | | | | | | |
| L4   | L | 01 | 0011 | 0017 | | | | | | | |
| L5   | L | 01 | 0017 | 0024 | | | | | | | |
| L6   | L | 01 | 001F | 0029 | | | | | | | |
| L7   | L | 01 | 002F | 0031 | | | | | | | |
| L8   | L | 01 | 0031 | 0033 | 0026 | | | | | | |
| L9   | L | 01 | 0045 | 0053 | | | | | | | |
| NXTP | L | 01 | 0023 | 0461 | 0418 | 0374 | 0356 | 0286 | 0073 | 0063 | 0056 |
| SDWA | L | 01 | 0231 | 0178 | 0137 | | | | | | |
| SE1  | L | 01 | 0284 | 0427 | | | | | | | |
| SE2  | L | 01 | 0290 | 0435 | | | | | | | |
| SE3  | L | 01 | 0293 | 0438 | | | | | | | |
| SE4  | L | 01 | 02A1 | 0447 | | | | | | | |
| SE5  | L | 01 | 0282 | 0424 | | | | | | | |
| SERS | L | 01 | 0276 | 0346 | 0319 | 0280 | 0072 | | | | |
| ST1  | L | 01 | 0266 | 0379 | | | | | | | |
| ST2  | L | 01 | 0269 | 0406 | | | | | | | |
| STAL | L | 01 | 026A | 0350 | 0323 | 0294 | 0254 | 0227 | 0197 | 0143 | 0080 |
| STCT | L | 01 | 023E | 0287 | | | | | | | |
| SV1  | L | 01 | 01F0 | 0313 | | | | | | | |
| SV2  | L | 01 | 021A | 0340 | | | | | | | |
| SVCG | L | 01 | 01DA | 0065 | | | | | | | |
| TBCG | L | 01 | 01C6 | 0066 | 0064 | | | | | | |
| TD1  | L | 01 | 01D1 | 0307 | | | | | | | |
| TDLY | L | 01 | 01D0 | 0472 | 0309 | 0271 | 0264 | 0257 | 0165 | | |
| WT1  | L | 01 | 02F2 | 0535 | | | | | | | |
| WT2  | L | 01 | 02F3 | 0511 | | | | | | | |
| WT3  | L | 01 | 02FB | 0517 | | | | | | | |
| WT4  | L | 01 | 031A | 0522 | | | | | | | |
| WT5  | L | 01 | 0322 | 0520 | | | | | | | |
| WTA  | L | 01 | 0311 | 0532 | | | | | | | |
| WTRD | L | 01 | 02F0 | 0503 | 0489 | 0477 | 0469 | 0460 | 0373 | 0364 | 0355 |
|      |   |    |      | 0337 | 0328 | 0285 | 0274 | 0244 | 0237 | 0217 | 0207 | 0187 |
|      |   |    |      | 0170 | 0162 | 0133 | 0124 | 0110 | 0041 | | |

00 ERRORS

EXHIBIT 'B'

FAIRCHILD MICROSYSTEMS DIVISION - F8 NATIVE ASSEMBLER (REV 2.0)
PROGRAM 2708'S FROM MEMORY
ERRS  LOC OBJECT ADDR LINE               SOURCE STATEMENT

```
                        0001        TITLE 'PROGRAM 2708''S FROM MEMORY'
                        0002  *
                        0003  *BEFORE STARTING PROG, SET UP P-LOG AS FOR MAN. PR(
                        0004  *SET DC0 TO ST ADDR, DC1 = END ADDR+1. MAKE CONN'S
                        0005  *(6E00) AND RESET P-LOG. XXX,3FF SHOULD SHOW ON P-L
                        0006  *IF PROG'ING WAS A SUCCESS, A "FINI" MSG WILL
                        0007  *APPEAR ON THE TERMINAL.    FTH  6/1/76
                        0008  *
                  0008 0009  TDAT   EQU   8
                  0008 0010  RDAT   EQU   8
                  0003 0011  CHAR   EQU   3
                  0000 0012  BCNT   EQU   0
                  0002 0013  BAUD   EQU   2
                  0006 0014  TEMP   EQU   6
                  2F4D 0015  OTER   EQU   H'2F4D'
                       0016         ORG   H'6E00'
        6E00 2028       0017         LI    H'28'
        6E02 52         0018         LR    BAUD,A
        6E03 70         0019         LIS   0
        6E04 B8         0020         OUTS  TDAT
        6E05 72         0021         LIS   2
```

FAIRCHILD MICROSYSTE  DIVISION - F8 NATIVE ASS  LER (REV 2.0)
PROGRAM 2708'S FROM MEI  Y
ERRS  LOC OBJECT ADDR LINE             SOURCE STATEMENT

```
6E06 B8              0022        OUTS  TDAT     SET DTR =1
6E07 11              0023        LR    H,DC     SAVE DC0
6E08 2C              0024        XDC
6E09 0E              0025        LR    Q,DC     SAVE DC1
6E0A 2C              0026        XDC
6E0B 73              0027        LIS   3
6E0C FA              0028        NS    10       HU
6E0D 2430            0029        AI    C'0'
6E0F 53              0030        LR    CHAR,A
6E10 286EA0 6EA0     0031        PI    OUCH
6E13 4B              0032        LR    A,11     HL
6E14 56              0033        LR    TEMP,A
6E15 286EEF 6EEF     0034        PI    CONV
6E18 2033            0035        LI    C'3'
6E1A 53              0036        LR    CHAR,A
6E1B 286EA0 6EA0     0037        PI    OUCH
6E1E 2046            0038        LI    C'F'
6E20 53              0039        LR    CHAR,A
6E21 286EA0 6EA0     0040        PI    OUCH
6E24 2046            0041        LI    C'F'
6E26 53              0042        LR    CHAR,A
6E27 286EA0 6EA0     0043        PI    OUCH
6E2A 2050            0044        LI    C'P'
6E2C 53              0045        LR    CHAR,A
6E2D 286EA0 6EA0     0046        PI    OUCH
6E30 70              0047        CLR
6E31 1F              0048 DLAY1  INC
6E32 94FE   6E31     0049        BNZ   DLAY1
6E34 286EC3 6EC3     0050        PI    INCH
6E37 2506            0051        CI    6        ACK?
6E39 940F   6E49     0052        BNZ   ERR1
6E3B 286EC3 6EC3     0053        PI    INCH
6E3E 2502            0054        CI    2        STX?
6E40 9408   6E49     0055        BNZ   ERR1
6E42 286EC3 6EC3     0056        PI    INCH
6E45 250D            0057        CI    H'D'     CR?
6E47 8409   6E51     0058        BZ    NEQ
6E49 2A6F0E 6F0E     0059 ERR1   DCI   ERRM1
6E4C 286E92 6E92     0060        PI    WRITE
6E4F 90FF   6E4F     0061        BR    *
6E51 16              0062 NEQ    LM
6E52 56              0063        LR    TEMP,A
6E53 286EEF 6EEF     0064        PI    CONV
6E56 11              0065        LR    H,DC
6E57 03              0066        LR    A,QL
6E58 EB              0067        XS    11
6E59 94F7   6E51     0068        BNZ   NEQ
6E5B 02              0069        LR    A,QU
6E5C EA              0070        XS    10
6E5D 94F3   6E51     0071        BNZ   NEQ      DC0=DC1?
6E5F 11              0072 DCEQ   LR    H,DC
6E60 70              0073        LIS   0
6E61 EB              0074        XS    11
6E62 8410   6E73     0075        BZ    CKDCU
6E64 16              0076 NFINI  LM
6E65 2046            0077        LI    C'F'
6E67 53              0078        LR    CHAR,A
6E68 286EA0 6EA0     0079        PI    OUCH
6E6B 2046            0080        LI    C'F'
6E6D 53              0081        LR    CHAR,A
6E6E 286EA0 6EA0     0082        PI    OUCH
6E71 90ED   6E5F     0083        BR    DCEQ
6E73 73              0084 CKDCU  LIS   3
6E74 FA              0085        NS    10
6E75 94EE   6E64     0086        BNZ   NFINI
6E77 70              0087        CLR
6E78 1F              0088 DLAY2  INC
6E79 94FE   6E78     0089        BNZ   DLAY2
6E7B 286EC3 6EC3     0090        PI    INCH
6E7E 2506            0091        CI    6        ACK?
6E80 9409   6E8A     0092        BNZ   ERR2
6E82 2A6F2C 6F2C     0093        DCI   FINIM
```

FAIRCHILD MICROSYSTE... DIVISION - F8 NATIVE ASS... ...ER (REV 2.0)
PROGRAM 2708'S FROM MEI...

```
ERRS  LOC  OBJECT  ADDR  LINE            SOURCE STATEMENT

6E85 286E92  6E92  0094           PI    WRITE
      6E88 90FF    6E88  0095           BR    *
      6E8A 2A6F1D  6F1D  0096   ERR2    DCI   ERRM2
      6E8D 286E92  6E92  0097           PI    WRITE
      6E90 90FF    6E90  0098           BR    *
      6E92 16            0099   WRITE   LM
      6E93 255C          0100           CI    C'r'
      6E95 8409    6E9F  0101           BZ    OUT
      6E97 51            0102           LR    1,A
      6E98 08            0103           LR    K,P
      6E99 282F4D  2F4D  0104           PI    OTER
      6E9C 09            0105           LR    P,K
      6E9D 90F4    6E92  0106           BR    WRITE
      6E9F 1C            0107   OUT     POP
      6EA0 200A          0108   OUCH    LI    10
      6EA2 50            0109           LR    BCNT,A
      6EA3 A8            0110   CTS     INS   RDAT
      6EA4 13            0111           SL    1
      6EA5 81FD    6EA3  0112           BP    CTS
      6EA7 73            0113           LIS   3
      6EA8 B8            0114           OUTS  TDAT
      6EA9 42            0115   DLY1    LR    A,BAUD
      6EAA 18            0116           COM
      6EAB 2401          0117   DLY2    AI    1
      6EAD 9001    6EAF  0118           BR    *+2
      6EAF 94FB    6EAB  0119           BNZ   DLY2
      6EB1 30            0120           DS    BCNT
      6EB2 840F    6EC2  0121           BZ    DONE
      6EB4 43            0122           LR    A,CHAR
      6EB5 18            0123           COM
      6EB6 2101          0124           NI    1
      6EB8 2402          0125           AI    2
      6EBA B8            0126           OUTS  TDAT
      6EBB 43            0127           LR    A,CHAR
      6EBC 12            0128           SR    1
      6EBD 2480          0129           AI    H'80'
      6EBF 53            0130           LR    CHAR,A
      6EC0 90E8    6EA9  0131           BR    DLY1
      6EC2 1C            0132   DONE    POP
      6EC3 79            0133   INCH    LIS   9
      6EC4 50            0134           LR    BCNT,A
      6EC5 A8            0135   START   INS   RDAT
      6EC6 81FE    6EC5  0136           BP    START
      6EC8 42            0137           LR    A,BAUD
      6EC9 18            0138           COM
      6ECA 1F            0139           INC
      6ECB 1F            0140   DLYI    INC
      6ECC 2B            0141           NOP         DUMMY, FOR TIME
      6ECD 94FD    6ECB  0142           BNZ   DLYI
      6ECF A8            0143           INS   RDAT
      6ED0 18            0144           COM
      6ED1 91F3    6EC5  0145           BM    START
      6ED3 2180          0146   LOOP    NI    H'80'
      6ED5 C3            0147           AS    CHAR
      6ED6 30            0148           DS    BCNT
      6ED7 9113    6EEB  0149           BM    STOP
      6ED9 8402    6EDC  0150           BZ    LOP2
      6EDB 12            0151   LOP3    SR    1
      6EDC 53            0152   LOP2    LR    CHAR,A
      6EDD 42            0153           LR    A,BAUD
      6EDE 18            0154           COM
      6EDF 2401          0155   DLY4    AI    1
      6EE1 27FF          0156           OUT   H'FF'  DUMMY, FOR TIME
      6EE3 94FB    6EDF  0157           BNZ   DLY4
      6EE5 A8            0158           INS   RDAT
      6EE6 18            0159           COM
      6EE7 9001    6EE9  0160           BR    *+2    DUMMY, FOR TIME
      6EE9 90E9    6ED3  0161           BR    LOOP
      6EEB 43            0162   STOP    LR    A,CHAR
      6EEC 217F          0163           NI    H'7F'
      6EEE 1C            0164           POP
      6EEF 08            0165   CONV    LR    K,P
```

FAIRCHILD MICROSYSTE. DIVISION - F8 NATIVE ASSE. LER (REV 2.0)
PROGRAM 2708'S FROM MEMORY

```
ERRS  LOC  OBJECT    ADDR  LINE                SOURCE STATEMENT

6EF0  46              0166          LR    A,TEMP
      6EF1  14              0167          SR    4
      6EF2  2509            0168          CI    9
      6EF4  8103     6EF8   0169          BP    CON1
      6EF6  2407            0170          AI    7
      6EF8  2430            0171   CON1   AI    C'0'
      6EFA  53              0172          LR    CHAR,A
      6EFB  286EA0   6EA0   0173          PI    OUCH
      6EFE  7F              0174          LIS   H'F'
      6EFF  F6              0175          NS    TEMP
      6F00  2509            0176          CI    9
      6F02  8103     6F06   0177          BP    CON2
      6F04  2407            0178          AI    7
      6F06  2430            0179   CON2   AI    C'0'
      6F08  53              0180          LR    CHAR,A
      6F09  286EA0   6EA0   0181          PI    OUCH
      6F0C  09              0182          LR    P,K
      6F0D  1C              0183          POP
      6F0E  0D0A            0184   ERRM1  DC    HL2'0D0A'
      6F10  464149          0185          DC    C'FAIL TO INITr'
      6F1D  0D0A            0186   ERRM2  DC    HL2'0D0A'
      6F1F  464149          0187          DC    C'FAIL TO PROGr'
      6F2C  0D0A            0188   FINIM  DC    HL2'0D0A'
      6F2E  46494E          0189          DC    C'FINIr'
                            0190          END
```

FAIRCHILD MICROSYSTEMS DIVISION - F8 NATIVE ASSEMBLER (REV 2.0)
PROGRAM 2708'S FROM MEMORY

```
SYMBOL TYP RL  VAL        REFERENCES

BAUD    A 00 0002   0153  0137 0115 0018
BCNT    A 00 0000   0148  0134 0120 0109
CHAR    A 00 0003   0180  0172 0162 0152 0147 0130 0127 0122
                    0081  0078 0045 0042 0039 0036 0030
CKDCU   L 01 6E73   0075
CON1    L 01 6EF8   0169
CON2    L 01 6F06   0177
CONV    L 01 6EEF   0064  0034
CTS     L 01 6EA3   0112
DCEQ    L 01 6E5F   0083
DLAY1   L 01 6E31   0049
DLAY2   L 01 6E78   0089
DLY1    L 01 6EA9   0131
DLY2    L 01 6EAB   0119
DLY4    L 01 6EDF   0157
DLYI    L 01 6ECB   0142
DONE    L 01 6EC2   0121
ERR1    L 01 6E49   0055  0052
ERR2    L 01 6E8A   0092
ERRM1   L 01 6F0E   0059
ERRM2   L 01 6F1D   0096
FINIM   L 01 6F2C   0093
INCH    L 01 6EC3   0090  0056 0053 0050
LOOP    L 01 6ED3   0161
LOP2    L 01 6EDC   0150
LOP3    L 01 6EDB
NEQ     L 01 6E51   0071  0068 0058
NFINI   L 01 6E64   0086
OTER    A 00 2F4D   0104
OUCH    L 01 6EA0   0181  0173 0082 0079 0046 0043 0040 0037
                    0031
OUT     L 01 6E9F   0101
RDAT    A 00 0008   0158  0143 0135 0110
START   L 01 6EC5   0145  0136
STOP    L 01 6EEB   0149
TDAT    A 00 0008   0126  0114 0022 0020
TEMP    A 00 0006   0175  0166 0063 0033
WRITE   L 01 6E92   0106  0097 0094 0060
00 ERRORS
```

We claim:

1. A system for selectively connecting any one of a first set of a plurality of electrical circuit points to any one of a second set of a plurality of electrical circuit points, comprising:

means including a plurality of separately controllable switching units for selectively connecting any one of said first set of circuit points to any one of said second set of circuit points in response to control signals, means for developing an electrical signal representative of two circuit points, one from each of said first and second sets, that are desired to be connected together, means independent of said connecting means and connected between each of said switching units and said signal developing means for communicating control and status signals therebetween, and means including programmed microprocessor connected to said control signal communicating means in a manner to communicate control and status signals in two directions between it and any of said signal developing means and switching units for making a connection between one circuit point of said first set of electrical circuit points and one circuit point of said second set of electrical circuit points as specified by said signal developing means.

2. The system according to claim 1 wherein said communicating means includes a single control bus to which each of said manual setting means and switching units are directly connected, said control means communicating individually with each of said signal developing means and switching units one at a time without any direct communication between said signal developing means and switching units over said control bus.

3. The system according to claim 2 wherein said control bus includes separate address and data buses, and wherein each of said signal developing means and switching units includes means for connection to said data bus in response to a unique address code placed upon said address bus by said control means.

4. The system according to claim 3 wherein said signal developing means includes a plurality of individually setable means which respond to said control means by their own unique addresses, said control means operating to sequentially scan each of said plurality of individually setable means to identify circuit connections desired thereby to be made and to control operation of said switching units to accomplish the desired connection.

5. A system for selectively connecting any one of a plurality of telephone electrical circuits to any one of a plurality of test ports connected at various positions remote from said plurality of electrical circuits in response to a request for such connection by said one test port, comprising:

means including a plurality of separately controllable switching units for selectively connecting any one of said telephone circuits to any one of said test ports in response to control signals, means independent of said connecting means and connected between all of said test ports and switching units for communicating control and status signals therealong, and means including a programmed microprocessor connected to said control signal communicating means in a manner to communicate control status signals in two directions between it and any of said test ports and said switching units one at a time for making connections between any one of said telephone circuits and any one of said test ports according to a request made at said one test port.

6. The system according to claim 5 wherein said control means includes means for repetitively and sequentially scanning one at a time through said control signal communicating means each of said test ports to identify when a particular telephone electrical circuit is requested by that test port to be connected to it through said switching means.

7. The system according to claim 6 wherein said control means includes means responsive to detecting a test port request to be connected to a particular telephone electrical circuit for sending appropriate command signals through said communicating means to each of the switching units that are required to make the requested connection.

8. The system of claim 7 wherein each of said test ports contains means enabled by a signal from said control means over said communicating means to conduct a continuity test from the test port to a connected telephone electric circuit before tests on that electrical circuit are permitted to occur, and further wherein said control means includes means for sending through said communicating means to said one test port a signal to initiate operation of the continuity test means after the requested telephone electrical circuit has been connected through said switching means to said test port.

9. The system according to claim 8 wherein said switching means includes means for splitting each of said telephone circuits, said control means additionally including means for sending to said switching means appropriate control signals to cause a telephone line to be split in only if a continuity test has been satisfactorily conducted on that telephone circuit from a test port to which it has been previously connected.

10. A system for selectively connecting any one of a plurality of telephone electrical circuits to any one of a plurality of test ports, comprising:

means to which said telephone electrical circuits are connected for accessing any of said circuits, means as part of each test port for developing a unique signal for requesting connection between that test port and a particular telephone electrical circuit in response to a signal at the test port of a unique access point number assigned to that telephone circuit, means including a plurality of separately controllable switching units for selectively connecting any one of said telephone circuit access points to any one of said test ports in response to control signals, a single control bus including control and data buses to which each of said test port requesting means and said switching units are directly connected, each of said test port requesting means and switching units including means responsive to a unique address on said address bus for operably connecting each of said units to said data bus, and control means including a programmed microprocessor connected to said address and data buses for individually communicating with each of said test port request means and switching units upon placing the particular unique address of the unit on said address bus, there being no direct communication between any of the test port request means and switching units over said address and data buses, said control means additionally includingmeans for sequentially addressing each of said test request means one at a time to discover when a telephone circuit access point is first requested for connection thereto, and means for causing any of said switching units that are necessary to be connected one at a time to form the desired access from that test port to the requested telephone access circuit.

11. The system according to claim 10 wherein each of said test port request means and switching units includes means responsive to an appropriate command from the control means on the data bus to connect to the data bus a signal representative of its unique address, and wherein said control means additionally includes means for comparing the address communicated back to it on the data bus with the address placed by the control means on the address bus, thereby to verify that the addressed test port request means or switching unit is in fact correctly connected to the data bus before continuing to send any commands thereto.

12. The system according to claim 10 wherein each of said test port request means includes means responsive to an initiation signal for emitting a signal on said control bus indicating that an accessed telephone circuit is to be split for further testing, wherein said accessing means includes means for splitting an accessed telephone circuit, and further wherein said control means includes further means for sequentially addressing each of said test request means one at a time to discover when a split signal exists thereat and in response to such a signal to communicte on said control bus a signal to the appropriate accessing means to cause said telephone circuit to be split if the circuit had previously been connected to the requesting test port.

13. The system according to claim 10 wherein said test port request means includes means for indicating to the operator when a requested telephone circuit cannot be accessed at the time, and further wherein said control means includes means for communicating on said data bus to said test port request means a signal energizing said indicating means when a requested telephone circuit access point cannot be connected to said test request port by reason of busy circuits therebetween or the non-existence of the requested access point.

14. A system for selectively connecting any one of a plurality of electrical circuits to any one of a plurality of test ports located at various positions remote from said plurality of electrical circuits, comprising:
a plurality of means responsive to a control signal for selectively making connection between any one of a separate group of said electrical circuits and an output circuit,
a plurality of test buses,
access concentrator means responsive to a control signal for selectively connecting any of said group connector means output circuits to any of said test buses,
port concentrator means responsive to a control signal for selectively connecting any of said plurality of test ports to any of said test buses, thereby to make any one of said electrical circuits connectable to any of said test ports by providing said group connector means, access concentrator means and port concentrator means the proper combination of control signals, whereby tests may be made upon any selected electrical circuit from any of said test ports,
a control bus including separate address and data buses all commonly connected to each of said group connector means, access concentrator means and port concentrator means for providing said control signals thereto,
each of said group connector means, access concentrator means and port concentrator means including means responsive to a unique address appearing on said address bus for enabling communication between the addressed unit and said common data bus,
a control panel and circuits provided as part of each of said test ports connected to said common address and data buses, including means on the test port control panel for manually setting by an operator of a specified code of the particular electrical circuit desired to be connected to that test port and means as part of the test port control circuits for communicating said circuit code to the data bus,
said controller including means for sequentially scanning all of said test ports through said control bus for detecting an operator initiated request to connect a test port to a particular electrical circuit,
means responsive to such an access request for sequentially addressing through said address bus each of particular group connector means, access concentrator, port concentrator and test ports that need to be connected together to effect connection of the desired electrical circuit to the requesting test port, and
means responsive to a particular unit being so addressed for directing the unit on said data bus to effect various electrical connections within the unit that are required to connect the operator addressed electrical circuit to the test port.

15. A method of establishing an electrical test signal path between any one of a plurality of telephone circuits through a plurality of separately controllable switching units to any one of a plurality of test ports in accordance with a manually initiated signal from the test port that specifies the particular circuit to be accessed by that test port, comprising the steps of:
providing a common control signal path independent of the test signal path to which each of the test port and switching units is connected,
sequentially scanning through the control signal path the access signals from each of the test ports in sequence,
determining for each test port when there has been a change in any access signal since the last scan of that test port,
determining which switching units need to be brought into the test signal path in order to effect the desired connection, and
addressing each of the selected switching units one at a time through the control signal path and directing proper internal connection of switching elements to effect the desired condition.

16. A method of establishing an electrical test signal path between any one of a plurality of telephone circuits through a plurality of separately controllable switching units to any one of a plurality of test ports in accordance with a manually initiated signal from the test port that specifies the particular circuit to be accessed by that test port, comprising the steps of:
providing a control circuit including common address and data control signal circuits independent of the test signal path and to which each of the test port and switching units is connected, setting each of the test port and switching units to respond to an individual unique address on the common address control circuit with an enablement of communication thereto through the data bus, individually addressing each of the test ports in sequence through the address control circuit, for each addressed test port, interrogating its access request status through the control circuit, comparing that access request status to the access request status the last time the test port was interrogated, if there has been a change in the test access request, identifying the switching units which need to be activated to effect the desired change in access, placing on the address control circuit the unique address of each of the identified switching units one at a time, and while each individual selected unit is addressed on the address control circuit, communicating to that unit the necessary switching action through signals on the data control circuit.

* * * * *